US 6,550,977 B2

(12) United States Patent
Hizuka

(10) Patent No.: US 6,550,977 B2
(45) Date of Patent: Apr. 22, 2003

(54) APPARATUS FOR CONNECTING OPTICAL CONNECTORS AND PRINTED CIRCUIT BOARD, UNIT MOUNTING THE SAME

(75) Inventor: Hidehiko Hizuka, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/767,715

(22) Filed: Jan. 24, 2001

(65) Prior Publication Data

US 2001/0010741 A1 Aug. 2, 2001

(30) Foreign Application Priority Data

Jan. 24, 2000 (JP) .......................... 2000-14695

(51) Int. Cl.⁷ ................................ G02B 6/38
(52) U.S. Cl. ..................... 385/55; 385/76; 385/139; 439/534
(58) Field of Search .................... 385/55, 56, 70, 385/72, 76, 78, 139; 439/131, 341, 342, 376, 534

(56) References Cited

U.S. PATENT DOCUMENTS

| | | | | |
|---|---|---|---|---|
| 5,887,100 A | * | 3/1999 | Robertson | 385/76 |
| 5,967,808 A | * | 10/1999 | Kubota | 439/157 |
| 6,217,363 B1 | * | 4/2001 | Tanaka | 439/342 |

FOREIGN PATENT DOCUMENTS

JP          2505865          4/1996

OTHER PUBLICATIONS

Patent Abstract of Japan of JP 02058004 A dated Fab. 27, 1990.

* cited by examiner

Primary Examiner—Khiem Nguyen
(74) Attorney, Agent, or Firm—Staas & Halsey LLP

(57) ABSTRACT

An optical-connector-adapter assembly for optically connecting a pair of optical fiber connectors includes a fixed base mounting one of the optical fiber connectors and a slidable base mounting an adapter for mounting the other connector. The slidable base can slide relative to the fixed base; one of the optical fiber connectors is fixed on the fixed base; and the other connector is inserted into the adapter mounted on the slidable base. The optical fiber connectors can be coupled or uncoupled optically when the slidable base, respectively, advances to of retreats from the base. Further, the slidable base can be inclined relatively to the fixed base at a position in which the optical fiber connectors are apart from each other. Accordingly, with the optical fiber connector adapter in an inclined position, the other optical fiber connector can be inserted into the adaptor and then the optical fiber connector adapter with the other connector, inserted therein, can be returned to an original, aligned direction relatively to, and connected with, the optical fiber connector mounted on the fixed base by moving the adapter axially to the fixed base. Therefore, the optical fiber connectors are optically coupled via the optical adapter without any requirement to check the position of the first optical fiber connector.

22 Claims, 29 Drawing Sheets

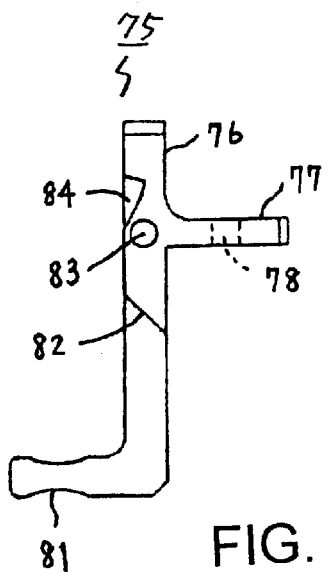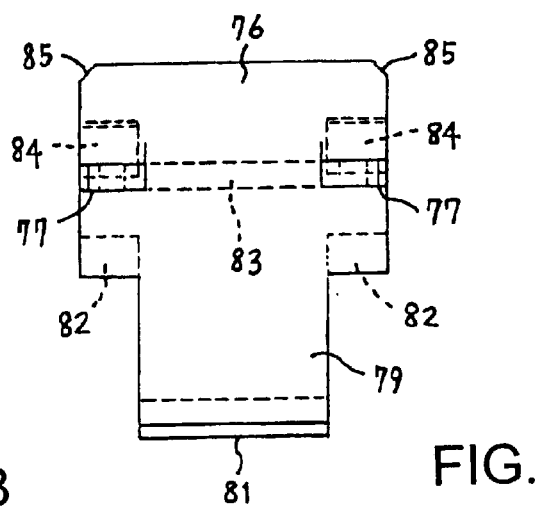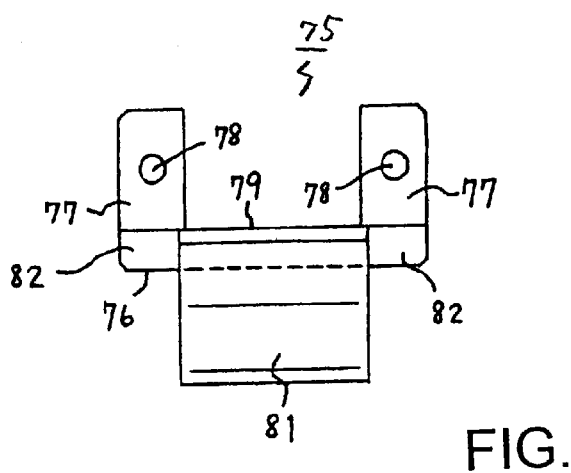
FIG. 15B
FIG. 15A
FIG. 15C

APPARATUS FOR CONNECTING OPTICAL CONNECTORS AND PRINTED CIRCUIT BOARD, UNIT MOUNTING THE SAME

BACKGROUND OF THE INVENTION

1. Field of the Invention

This invention relates to an optical fiber connector and more specifically to an improved apparatus for connecting optical fibers in a pair of optical fiber connectors.

2. Description of the Related Art

In recent years, the widespread use of communication, such as "Internet", leads to the abrupt increase of traffic in communication, which urges the introduction of WDM (Wavelength Divisional Multiplexing) system into the core network of the communication system. The WDM system can allows multiplexed optical signals to be carried in a single optical fiber for improve the efficiency of transmission. Accordingly, the intensity of the light transmitted by the optical fiber becomes lager, because the transmitted optical signals are multiplexed by the system.

Similar to the conventional network using the electrical conductive wires, the transmission lines using the optical fibers should be interconnected and branched at required portions in the network by optical fiber connectors and adapters. For these connections and branches of the lines, various kinds of optical fiber connectors for providing the suitable connections and branches of lines at required portions have been manufactured and used selectively.

With reference to FIGS. 1 to 3, a conventional optical fiber connectors mounted on a printed circuit board is described in detail. FIG. 1 shows an optical fiber connector 3 which is one of the conventional optical fiber connectors known and standardized as SC type optical fiber connector. The optical fiber connector 3 can be connected with or disconnected from another optical fiber connector by the use of an adapter described hereinafter. An optical fiber cable 1 including an optical fiber (not shown) is protected from abrupt bending with a strain relief jacket 2 formed in cone-shape made of a flexible material such as rubber or similar one. Through the jacket 2, the cable 1 is introduced into the optical fiber connector 3.

The optical fiber connector 3 has, at a peripheral portion, an outer housing 4 which is of generally rectangular shape in a section along the line P—P in FIG. 1 and is made of synthetic resin. A knurled handle 5 is formed on the periphery of the housing 4 but around the housing 4 for easy operation when the optical fiber connector 3 is inserted into or released from the adapter. A marking 6, near apart a polarizing tab or a key 7 as a projection, formed at a central portion of a wall of the housing 4 is provided as an indicator to notice whether the optical fiber connector 3 is inserted by sufficient depth into the adapter. The optical fiber in the optical fiber cable 1 is guided to an end face of a ferrule 8 via a bore or hole provided along an axis of the ferrule 8.

With reference to FIG. 2, a connection between both optical fiber connectors 3 is explained. A pair of optical fiber connectors 3 is connected to be optically coupled with each other by the mean of the adapter 15. Each of parts having the same or similar function has reference of same numeral before hyphen such as 2-1 and 2-2 when it is necessary to distinguish one of parts having identical or similar function from the other. The adapter 15 has cavities suitable to receive the outer housings 4 of the optical fiber connectors and an aligning ferrule for aligning the ferrules 8 so that the front ends of the optical fibers can be faced each other.

Thus a pair of optical fiber connectors 3-1 and 3-2 are coupled via the adapter 15. Both of the ferrules 8-1 and 8-2, which are not shown in FIG. 2, are pushed each other by springs (not shown) mounted in each connectors 3-1 and 3-2. Accordingly the front ends or the front faces of the ferrules 8-1 and 8-2 come close to each other, hence the optical fibers in each ferrules 8-1 and 8-2 are allowed to transmit optical signals to each other with little transmission loss.

These optical fiber connectors 3-1 and 3-2 coupled to the adapter 15 can be released from the adapter 15, by the way that one of the connectors 3-1, 3-2 is gripped at the knurled handle 5 and then pulled rearward the connector 3-1 or 3-2 from the adapter 15, while the adapter 15 is being fixed by the other hand. The other connector 3-1 or 3-2 can also released in the same way.

As described above, the connection and the release of the optical fiber connectors 3-1, 3-2 can be done easily by one touch handling.

With reference to FIG. 3, one of applications of a pair of the optical fiber connectors 3-1, 3-2 mounted on a printed circuit board assembly 31 applied to an optical unit, such as WDM, is described. The printed circuit board assembly 31 includes a printed circuit board 32, hereinafter referenced to simply as PCB, having the connectors 3-1, 3-2, electronic parts, and others. The printed circuit board assemblies 31 are slidably inserted into a rack (not shown) of the unit along the guide grooves (not shown) mating with an upper and lower ends of the PCBs 32, maintaining its surface being generally vertically. At the front end portion of the PCB 32 is provided a front panel 35, at a rear end portion of the PCB 32 are provided connectors for electrical connection with connectors mounted to the unit. The electrical connection can be accomplished by plug-in way at the same time when the printed circuit board assembly 31 is sufficiently inserted into the rack.

The front panel 35 having an uniformly wide flange upstanding to the sheet is provided at the front portion of the PCB 32, hence the front portion is covered from upper to lower against the exterior of the rack. The front panel 35, further includes required parts for indicating or operating the unit.

The adapter 15 is mounted on a portion near the front panel 35 on the PCB 32 via a figure-L-shaped angle 36 with bolts or rivets. A portion of the adapter 15 is exposed forward from the flange of front panel 35 through an opening thereof. The optical fiber connector 3-1, 3-2 are inserted obliquely downward and upward into the adapter 15 respectively for transmitting or receiving optical signals between both connectors 3-1, 3-2.

When the PCB assembly 31 shown in FIG. 3 is used for transmitting optical signals in the optical unit, the other end of the optical fiber 1-1 of the optical fiber connector 3-1 is coupled with an optical transmitter-module including a semiconductor laser (not shown in FIG. 3), hence a laser light is transmitted to the front face of the ferrule 8 within the inner connector 3-1.

During the optical module being active as described above, the outer connector 3-2 should be released from the optical adapter 15 prior to tests for measuring operating characteristics of the optical signal, or condition of transmission line connected with the connector 3-2. And then an optical fiber connector connected to a test unit may be inserted to the adapter 15, and after the test the outer connector 3-2 should be again connected to the adapter 15. In this situation, these connections to the adapter 15 may be done in watching the opening of the adapter 15 to make sure the position of the adapter 15.

It should be avoided to see the adapter 15 in facing the opening of the adapter 15, because the laser light transmitted out of the optical fiber may impinge directly on eye resulting in an injury, while it is safe to see obliquely the adapter 15 and the opening of the adapter 15 is designed so as to look downwards as possible. However the increase of power of the optical signals is liable to cause the damage.

To avoid this dangerous matter, therefore, the opening of the adapter 15 is faced as obliquely downwardly as possible. However, with consideration of increase of the amount of power transmitted in an optical fiber cable, it is desired that an assembly of optical fiber connectors may minimize the occurrence of the dangerous matter.

The present invention is directed to provide a mounting assembly for optical fiber connectors which may minimize the occurrence of the dangerous matter.

SUMMARY OF THE INVENTION

In the present invention there is provided an optical-connector-adapter assembly for optically connecting a pair of optical fiber connectors. The assembly includes a base capable of mounting one of the optical fiber connectors, and a slideable base mounting the other connector. The slidable base can slide relative to the base, and one of the optical fiber connectors is fixed on the base, the other connector is inserted into the adapter mounted on the slidable base.

BRIEF DESCRIPTION OF THE DRAWIN

FIG. 15A is a plan view of a slidable base;

FIG. 15B is a side view of the slidable base shown in FIG. 15A;

FIG. 15C is a bottom view of the slidable base shown in FIG. 15A;

DETAILED DESCRIPTION OF THE PREFERED EMBODIMENT

The objects of this invention are to provide an optical-fiber-connector adapter assembly that can connect and disconnect optically a pair of optical fiber connectors each other without looking for a position for one of the connectors to be connected optically with the other.

With reference now to the several drawings in which identical elements are numbered identically throughout, a description of preferred embodiment of the present invention will now be provided in detail.

Figure 1:
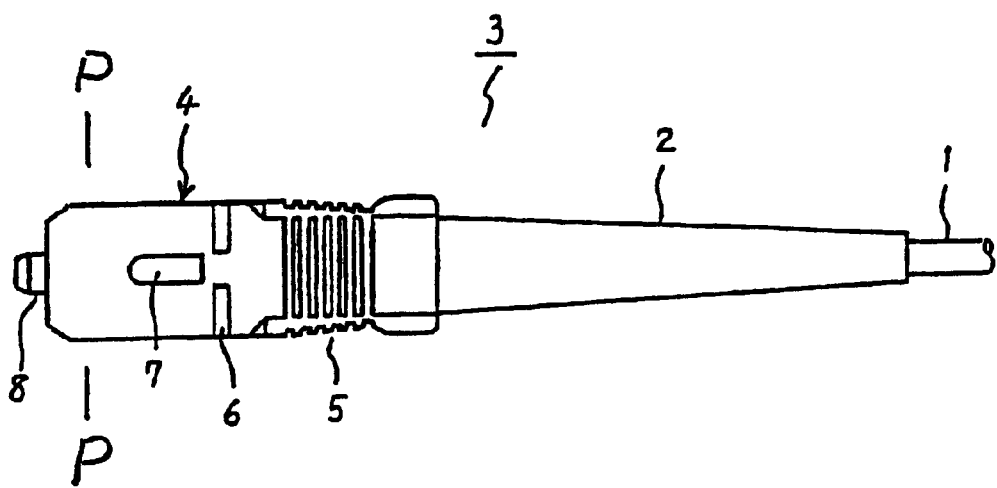
FIG. 1 is a plan view of an optical fiber connector.
Figure 2:
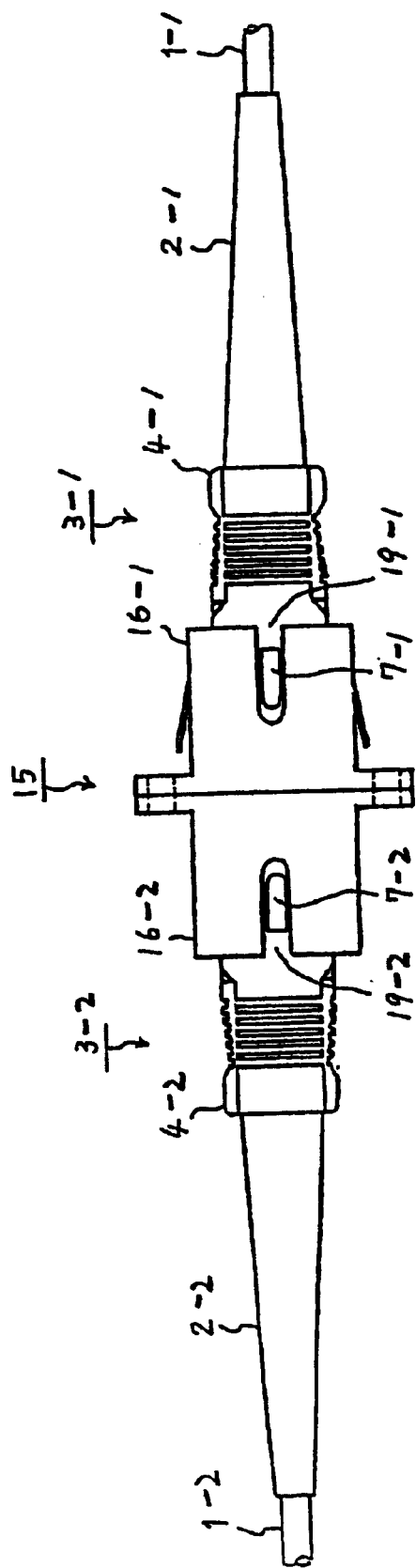
FIG. 2 is a plan view of a pair of optical fiber connectors, shown in FIG. 1, optically coupled via an adapter.
Figure 3:
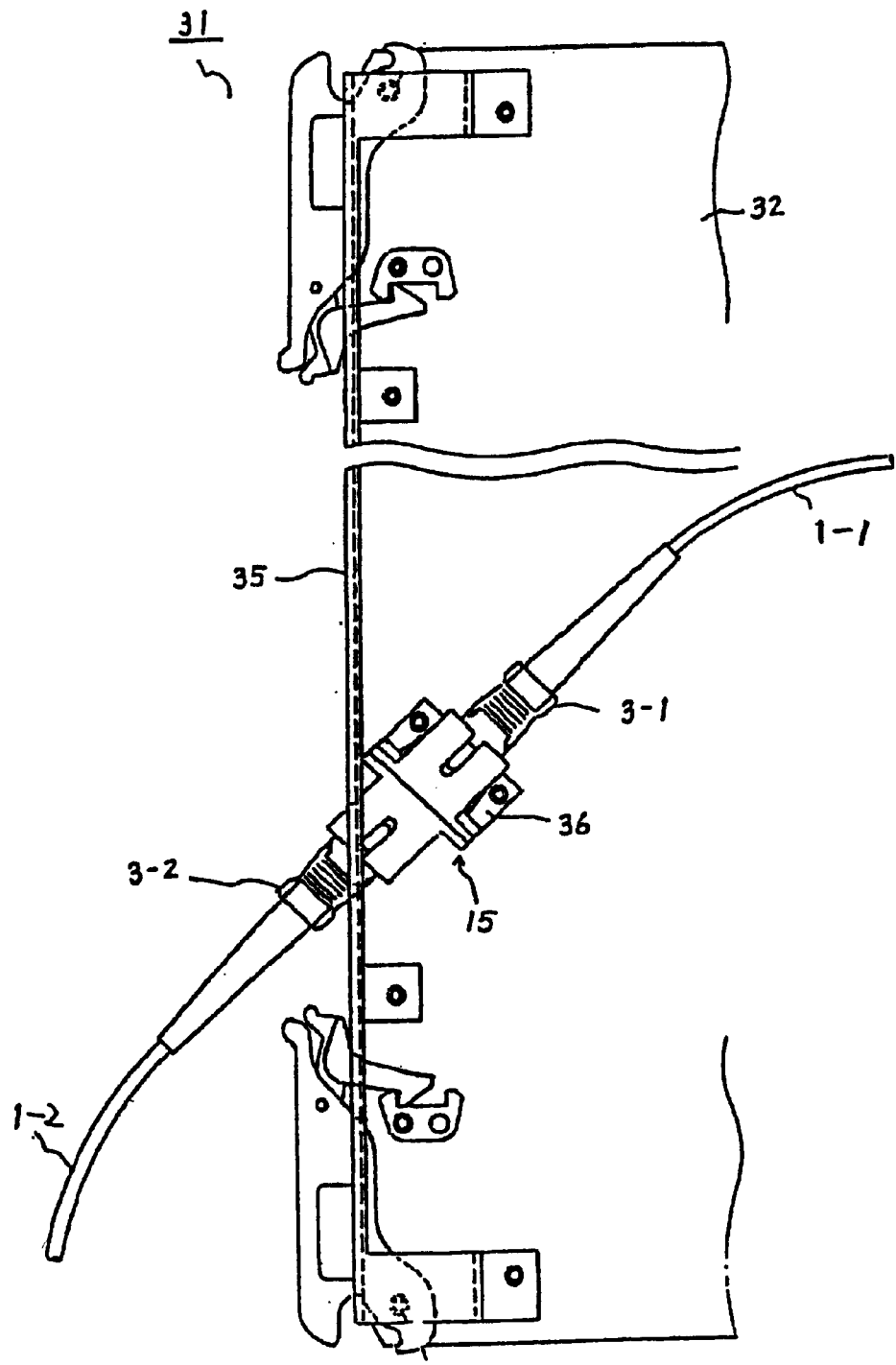
FIG. 3 is a plan view of a printed circuit board including a pair of the optical fiber connectors and the adapter shown in FIG. 2.

In the present embodiment, the optical fiber connector 3 shown in FIG. 1 is available, and the explanations of each part which have been explained above are adopted. With reference to FIGS. 4 to 8, detail structures of the optical fiber connector 3 and the adapter 15 are described. The references used in FIGS. 1 to 3 are used hereafter for identical or similar parts.

Figure 4B:
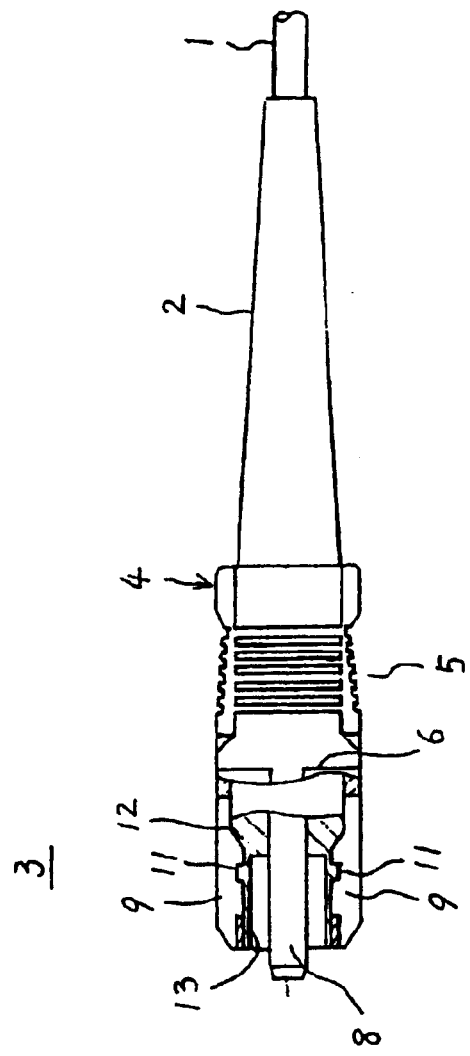
FIG. 4B is a plan and partially sectional view of the optical fiber connector shown in FIG. 4A.
Figure 4A:
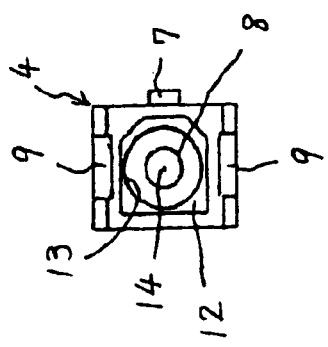
FIG. 4A is a front view of an optical fiber connector.

With reference to FIGS. 4A and 4B, an arrangement around the ferrule 3 is particularly explained. FIG. 4A shows the plane view, and FIG. 4B shows a side view of the optical fiber connector 3 with a partial cross section near around of the ferrule 8

An inner housing 12 made of synthetic resin is inserted into and engaged with a cavity of the outer housing 4. The inner housing 12 also has a cylindrical cavity 13 including an opening end, and the ferrule 8 is fixed securely at a bottom opposing to the opening end of the cavity 13. The cylindrical cavity and the cylindrical part of the ferrule 8 are same longitudinal axis. The ferrule 8 is made of ceramics, such as zirconium, which allows a hard and smooth surface of the ferrule 8. A hole or bore is provided as a through hole along the longitudinal axis of the cylindrical part of the ferrule 8 for receiving the optical fiber 14. The optical fiber 14 having a lapped front surface is glued to the ferrule 8 so that a front surface of the ferrule 8 is coincident with that of the fiber 14. The ferrule 8 is pushed outward of the cavity 13 by a spring not shown in FIGS. 4A and 4B.

Figure 5:
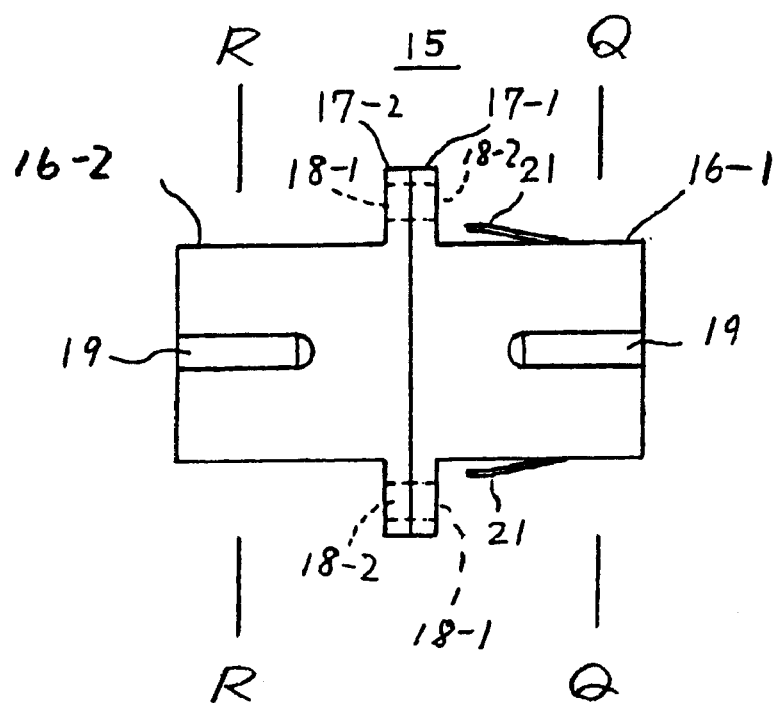
FIG. 5 is a plan view of an adapter.

A pair of the optical fiber connectors 3 are opposed each other and maintained securely with the adapter 15 shown in FIG. 5 for the purpose of optically connecting the optical fibers 14 for efficient transmission with little optical loss at the interface between these. FIG. 5 schematically shows the plane view of the adapter 15 which is integrated with a pair of similar housings 16-1 and 16-2 fixed securely with connecting means, such as nuts and bolts, or rivets. Each of the housings 16-1 and 16-2 molded of synthetic resin or light metal such as aluminum alloy includes generally similar arrangements respectively and has generally rectangular shape in a section along the lines Q—Q and R—R in FIG. 5 respectively. Each of the housings 16-1 and 16-2 has flange 17-1 or 17-2 at each one end respectively, where holes 18-1 and 18-2 are formed for the connecting means.

On the sidewalls of the housings 16-1 and 16-2, slots 19-1 and 19-2 are formed toward to the flanges 17-1, 17-2 respectively, with opening at the each end of the sidewall. The housing 16-1 further has leaf springs 21 for fixing the adapter 15 to a mother board, for example, and the leaf springs 21 extends obliquely toward to the flange 17-1 from the side wall.

Figures 6A, 6B:
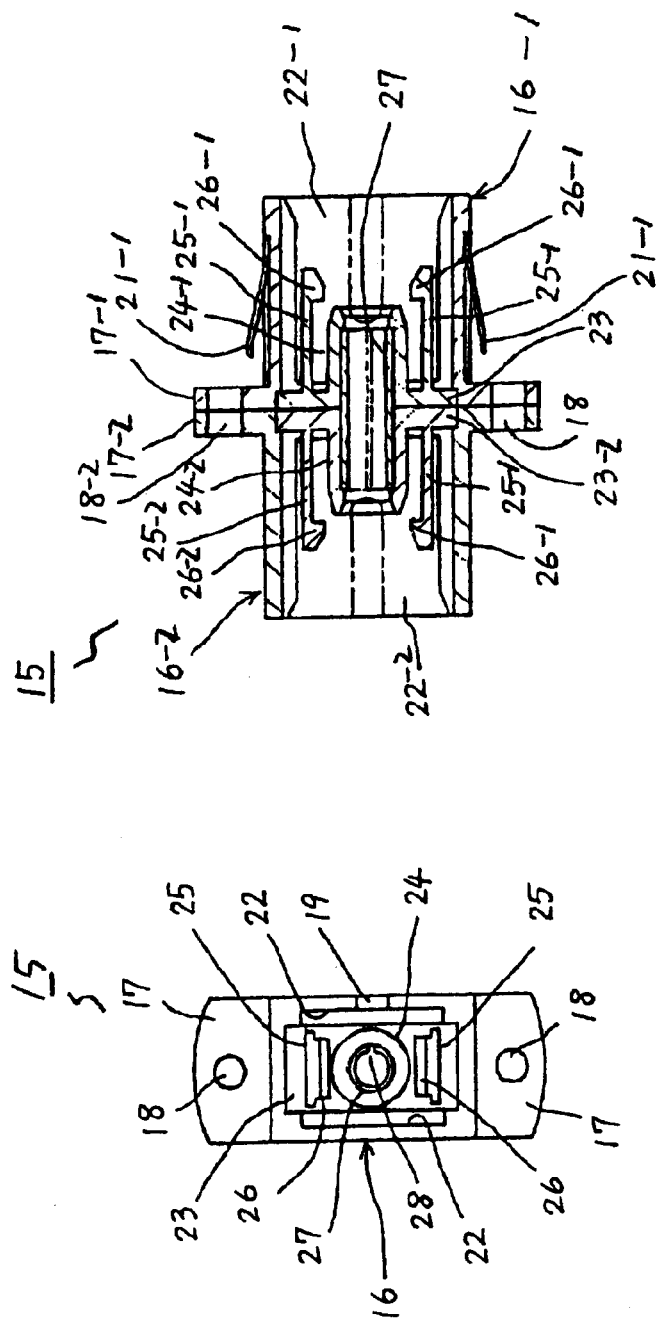
FIG. 6A is a front view of the adapter shown in FIG. 5.
FIG. 6B is a plan view in section of the adapter shown in FIG. 5.

With reference to FIGS. 6A and 6B, which show a plane view and a cross section of the adapter 15 respectively, more detail of the adapter 15 will be explained. Guide surfaces 22-1 and 22-2, which are inner surfaces of the side walls of the housings 16-1 and 16-2, are parallelly oppose to each other and allow to lead a pair of optical fiber connectors 3-1 or 3-2 to a required position in the adapter 15 when the optical fiber connectors 3-1 or 3-2 are inserted into the adapter 15 through the openings at both ends of the adapter 15. A pair of holders 23 positioned in a central part of the adapter 15 is fixed securely between the housings 16-1 and 16-2.

The holders 23 are made of synthetic resin and have cylindrical parts 24 between a pair of locking arms 25 located in parallel with and off axial from the axis of the cylindrical parts 24. At the end of each arm 25, the locking arms 25 have locking claws 26 which are formed so as to oppose each other. The locking arms 25 are allowed to move elastically like leaf springs, whereby the claws 26 can move near and far each other.

The outer diameter of the cylindrical parts 24 is suitable dimension to mate with a diameter of the cavity 13 of the inner housing 12 of the optical fiber connector 3 in FIGS. 4 and 4B. An aligning ferrule 27 is inserted and held securely within the cylindrical parts 24. An inner diameter of the aligning ferrule 27 is merely smaller than the outer diameter of the ferrules 8, however the aligning ferrule 27 has a longitudinal slit 28, whereby the ferrule 8 can be received and held securely by the aligning ferrule 25 when inserted in the aligning ferrule 27, and can be released when disconnected from the aligning ferrule 27.

Figure 7:
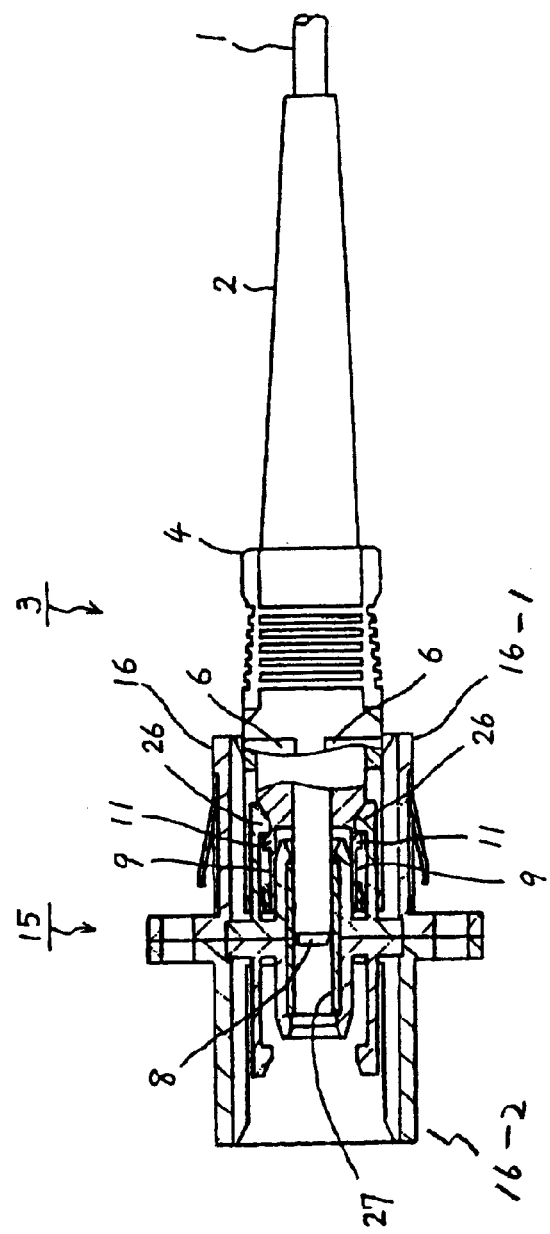
FIG. 7 is a plan and partially sectional view of the optical fiber connector, shown in FIG. 4B, inserted into the adapter shown in FIG. 6B.

With reference now to FIG. 7, the movement of optical fiber connector 3 and the adapter 15 when connected each other is described in detail. The locking arms 25 can mate with a recessed surface 9 as groove when the optical fiber connector 3 is inserted to the adapter 15, whereby the connector 3 can move forward correctly to the position where the locking claws 26 position behind a latch projection 11 after the claws 26 being lifted by the projection according further insertion of the connector 3. In this situation, the latch projection 11 prevents rearward extraction of the optical fiber connector 3 by the claws 26. The marking 6 is positioned within the housing 16 when the connector 3 is inserted into the adapter 15 till the claw 26 has been situated behind the projection 11, hence it is possible to check the sufficient insertion of the connector 3 by whether the mark 6 can be seen or not.

The optical fiber connector 3 can be correctly inserted into the adapter 15 only when the key 7 is positioned so as to mate with the slot 19, hence except this case the connector 3 cannot be inserted into the adapter 15.

Further the front face of the ferrule 8 is positioned so that the face is extruded toward the opposing housing 16-2 a little beyond the mating surfaces of a pair of housings 16-1, 16-2 when the connector 3-1 is sufficiently inserted into the adapter 15.

Figure 8:
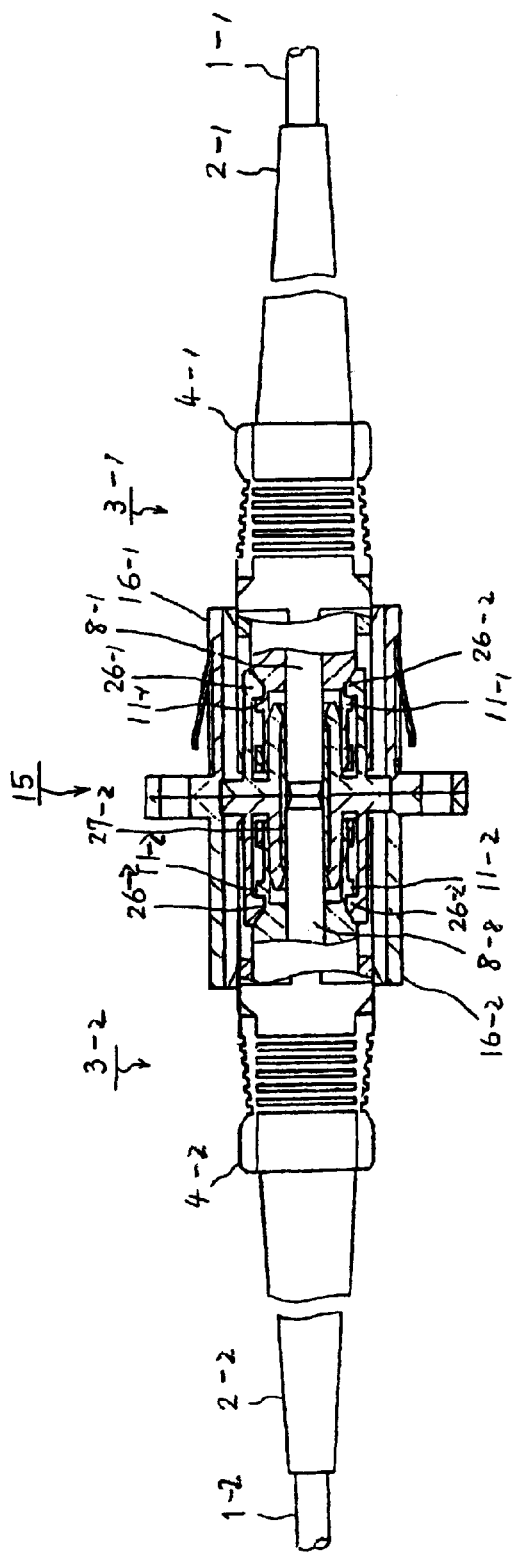
FIG. 8 is a plan view and a partially sectional view of a pair of the optical fiber connectors, shown in FIG. 4B, coupled each other via the adapter shown in FIG. 6B.

The connector 3-2 to be optically connected to the connector 3-1 is inserted into and positioned within the adapter 15 by the same way described above, whereby the both front faces of the optical fiber connectors 3-1, 3-2 are abutted or contacted with each other and held securely. FIG. 8 shows the generally schematic cross section of the situation.

Both of the ferrules 8-1 and 8-2 are pushed each other by springs (not shown) mounted in each connectors 3-1 and 3-2 to make sure for a pair of optical fiber connectors 3-1, 3-2 to be coupled optically. Accordingly the front faces of the ferrules 8-1 and 8-2 come close to each other, hence the optical fibers in each ferrules 8-1 and 8-2 are allowed to transmit optical signals to each other with little transmission loss.

Further, both ferrules 8-1 and 8-2 are driven into the aligning ferrule 27 through each of the openings of the ferrule 27, hence the ferrules 8-1 and 8-2 are force-fitted by the resilient force by the ferrule 27, whereby axes of each ferrules 8-1 and 8-2 can be generally in agree with each other in the vicinity of contact portion of the ferrules 8-1,8-2. Accordingly a preferable optical connection between both optical coated fibers is provided.

These optical fiber connectors 3-1, 3-2 coupled each other via the adapter 15 can be released from the adapter 15 by way of pulling the optical fiber connectors 3-1, 3-2 with required force rearward form the adapter 15 respectively, while fixing the adapter 15 and gripping one of the connectors 3-1 or 3-2 at the knurled handle 5 by hands. Because the application of the required force can lease the engagements between the claws 26 and the projections 11. Either of the connectors 3-1, 3-2 can be easily released in the same way described above by one touch handling The connection of a pair of the optical fiber connectors 3-1, 3-2 via the adapter 15 has been explained above. Now with reference to FIGS. 9 to 20, an optical-fiber-connector assembly is explained in detail.

Figure 9:
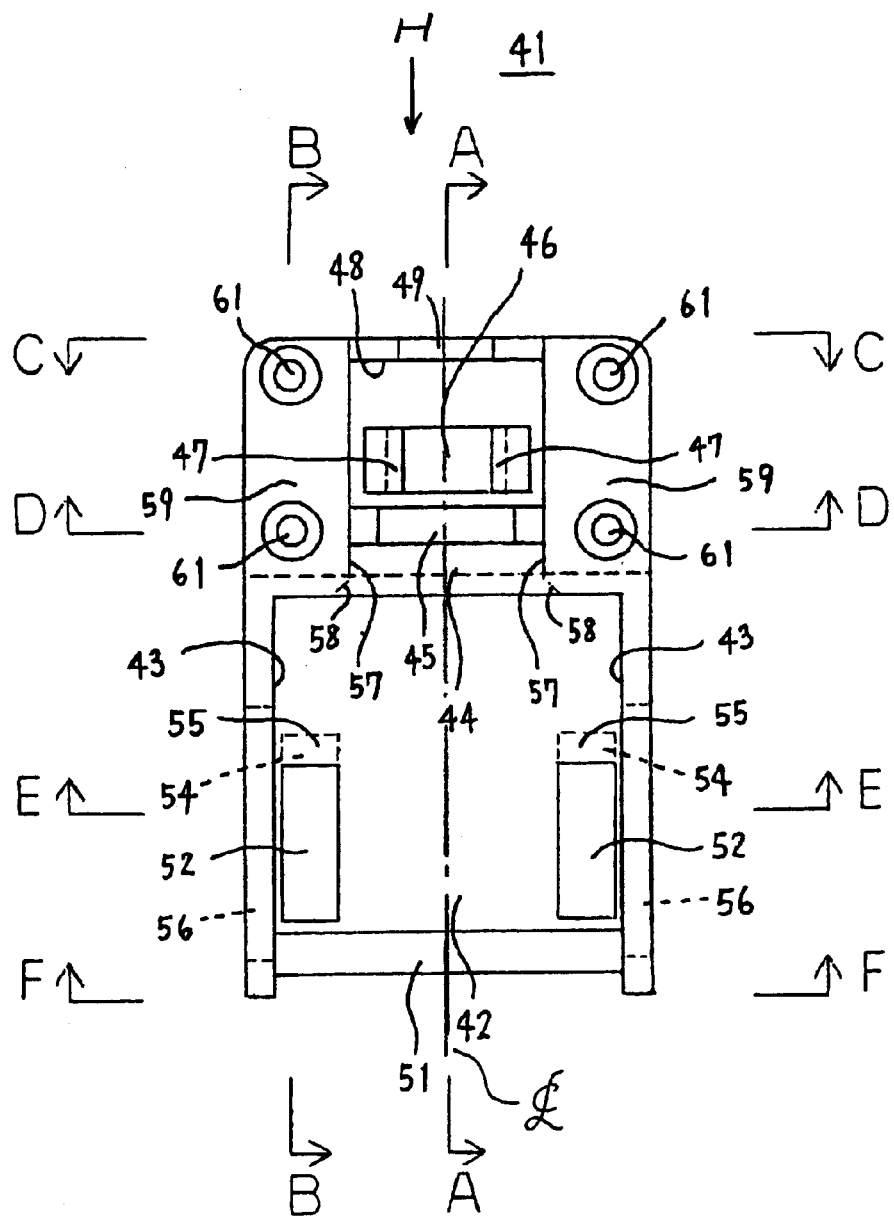
FIG. 9 is a plan view of a base.

With reference to FIGS. 9 to 12, a base 41 is described in detail. FIG. 9 shows a plan view of the base 41. FIG. 10A shows a sectional view of the base 41 taken in the direction of the arrows along the line A—A in FIG. 9. FIG. 10B shows a sectional view of base 41 taken in the direction of arrows along the line B—B in FIG. 9. FIG. 11A shows a top view of the base 41 taken in the direction of arrows along the line C—C in FIG. 9. FIG. 11B shows a sectional view of the base 41 taken in the direction of arrows along the line D—D in FIG. 9. FIG. 11C shows a sectional view of the base 41 taken in the direction of arrows along the line E—E in FIG. 9. FIG. 11D shows an end view of the base 41 taken in the direction of arrows along line F—F in FIG. 9.

The base 41 is preferably integrally made of synthetic resin having hard, tough, and suitable resilient property such as polycarbonate. The base 41 includes a generally flat bottom 42 having sidewalls 43 opposing each other in parallel. An upper side surface 44 is provided through a difference in level to the bottom 42, and has a positioning frame 45 having upstanding projections for positioning the optical fiber connector 3 not shown in FIG. 9 and a locking arm 46 formed near the frame 45. The locking arm 46 has a pair of arms provided a pair of claws 47 in opposing each other on tips thereof.

At the upper end the base 41, a position-fixing wall 48 having a half-round cutout 49 for fixing the axial position of the connector 3 is formed. The upstanding projections of the frame 45, the claws 47 of the locking arm 46, the cutout 49 and parts, which will be described hereinafter, formed on the base 41 are generally formed symmetrically about the center line of the base 41.

Figure 10A:
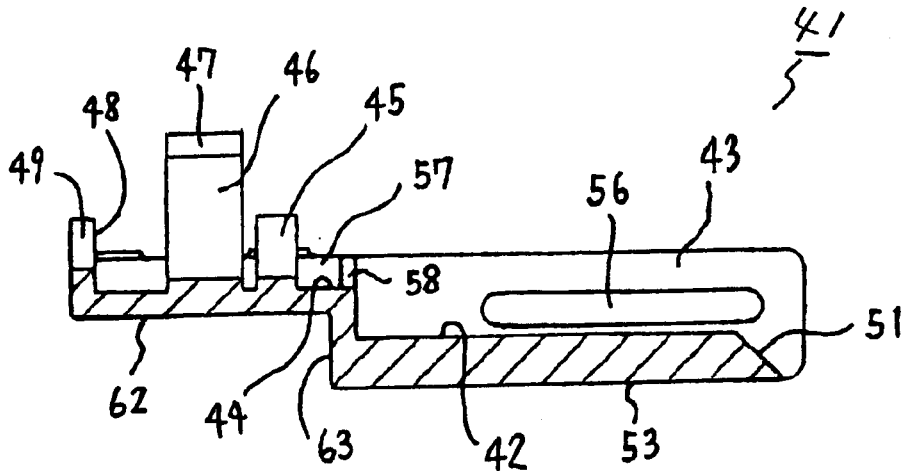
FIG. 10A is a sectional view taken in the direction of the arrows along the line B—B of the base shown in FIG. 9.
Figure 10B:
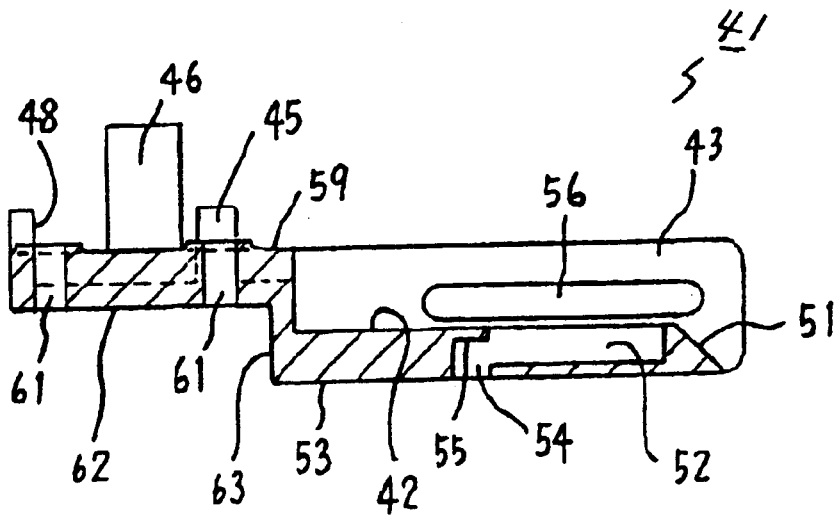
FIG. 10B is a sectional view taken in the direction of the arrows along the line A—A of the base shown in FIG. 9.
Figure 11A:
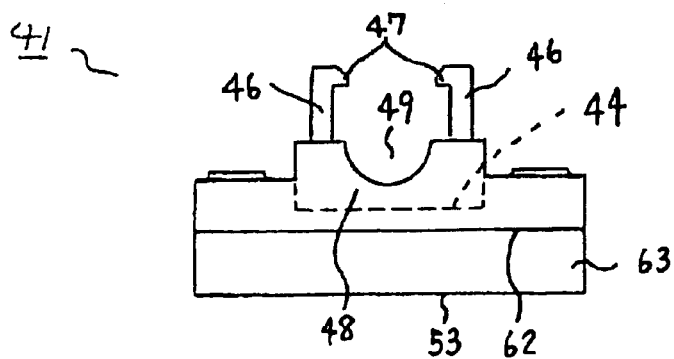
FIG. 11A is an top view taken in the direction of the arrows along the line C—C of the base shown in FIG. 9.
Figure 11B:
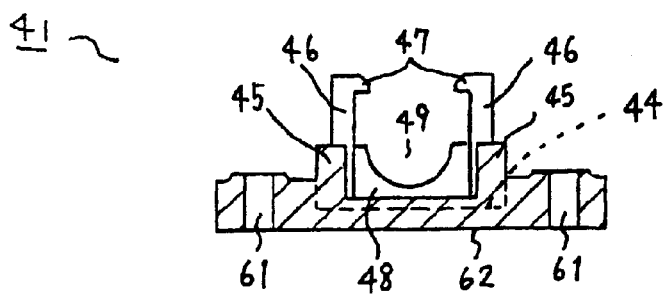
FIG. 11B is a sectional view taken in the direction of the arrows along the line D—D of the base shown in FIG. 9.
Figure 11C:
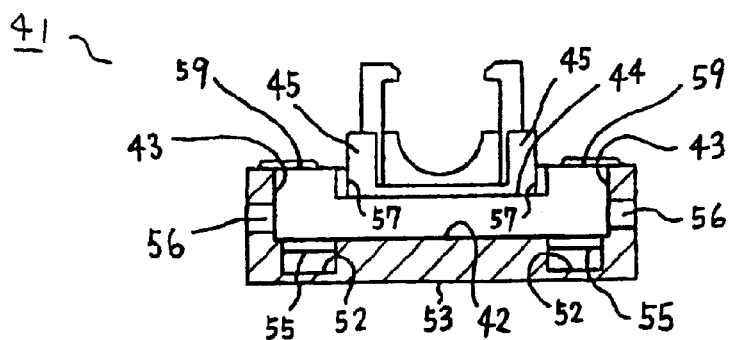
FIG. 11C is a sectional view taken in the direction of the arrows along the line E—E of the base shown in FIG. 9.
Figure 11D:
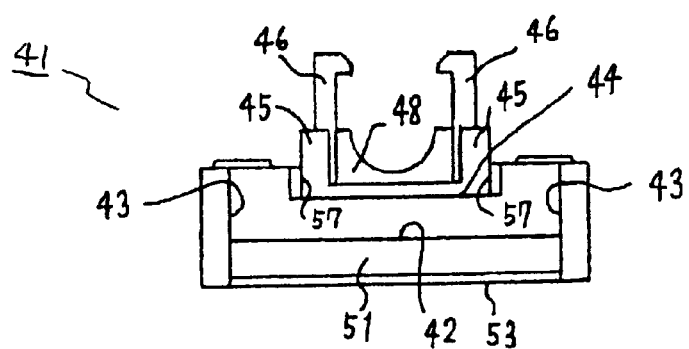
FIG. 11D is an end view taken in the direction of the arrows along the line F—F of the base shown in FIG. 9.

A slope 51 is provided at the lower end of the bottom 42 and the slope 51 is generally at an angle 45° relative to the bottom 42 as shown in FIGS. 10A and 10B, in this embodiment. At right and left sides of the base 41, a pairs of recessed openings 52 to cavities 54 having openings at a rear surface 53 and a extending portion, as shown in FIG. 10B.

A pair of side walls 43 formed beside the recessed openings 52 includes a pair of opposing slits 56 in extending horizontal direction as shown in FIG. 10B and half-round ends.

A pair of sidewalls 57 opposing each other in parallel at required intervals, are formed at both sides of the upper side surface 44. The walls 57 intersect with an upstanding wall formed upper end of the bottom 42 and have chamfered corners 58 at the intersections of the walls 57 and the upstanding wall. The sidewalls 57 intersect with top surfaces 59 at right angle and are in parallel to the sidewalls 43. Each of the top surfaces 59 is provided with two through holes 61 for fixing the base 41 to a PCB as hereinafter more fully described.

The height difference between rear surfaces 62 and 53 in FIG. 10A or 10B equals to that between the upper side surface 44 and the bottom 42.

Figure 12A:
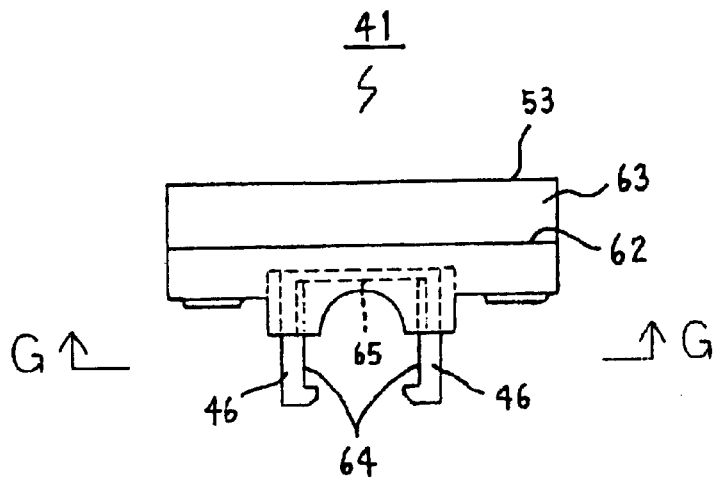
FIG. 12A is an end view taken in the direction of the arrow H of FIG. 9.
Figure 12B:
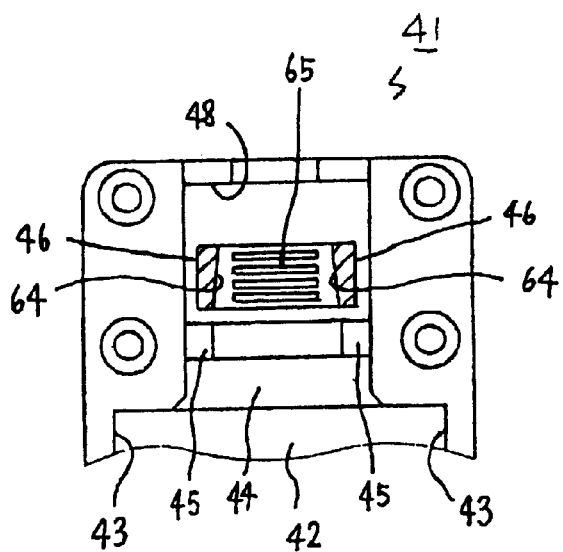
FIG. 12B is a segmentary view taken in the direction of the arrows along the line G—G in FIG. 12A.

With references to FIGS. 12A to 12B, a portion around arms 46 is described in detail. FIG. 12A shows an end view taken in the direction of arrow H in FIG. 9 and FIG. 12B shows a segmentary view taken in the direction of arrows G—G in FIG. 12A. A pair of the locking arms 46 has sloped sides 64 sloping downwardly outwards and there is provided a knurled portion 65 at a bottom between the locking arms 46.

Figure 13A:
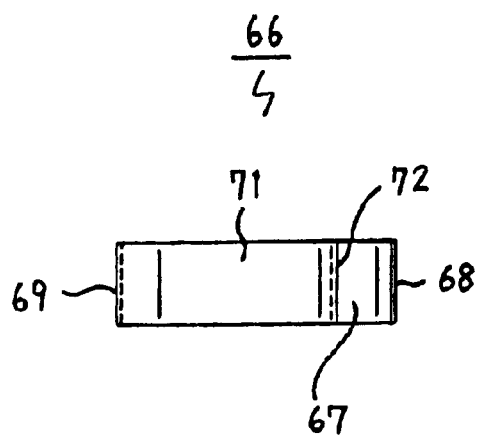
FIG. 13A is a top view of a figure-V-shaped leaf spring.
Figure 13B:
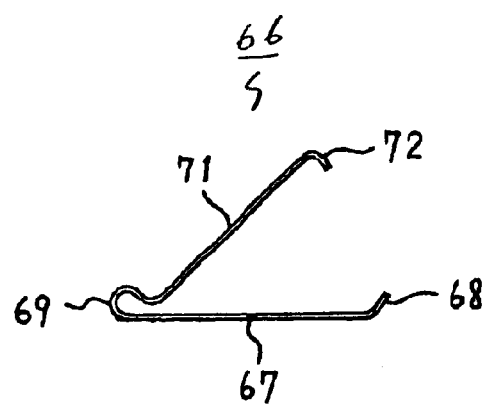
FIG. 13B is a side view of the spring shown in FIG. 13A.

FIG. 13A shows a top view of a figure-V-shaped leaf spring 66 and a side view of that is shown in FIG. 13B. The figure-V-shaped spring 66 is integrally made of metal leaf for spring, such as stainless steel for springs or phosphor bronze. The spring 66 has a curved base portion 69 from which arms 67 and 71 extend at an angle outward each other. A tip potion 68 of the arm 67 is bent obliquely upward, and a tip of the arm 71 is bent generally perpendicular to the arm 71. The shape of the spring 66 is not necessarily identical to "V", however referenced as the figure-V-shaped spring for simplicity.

Figures 14A, 14B:
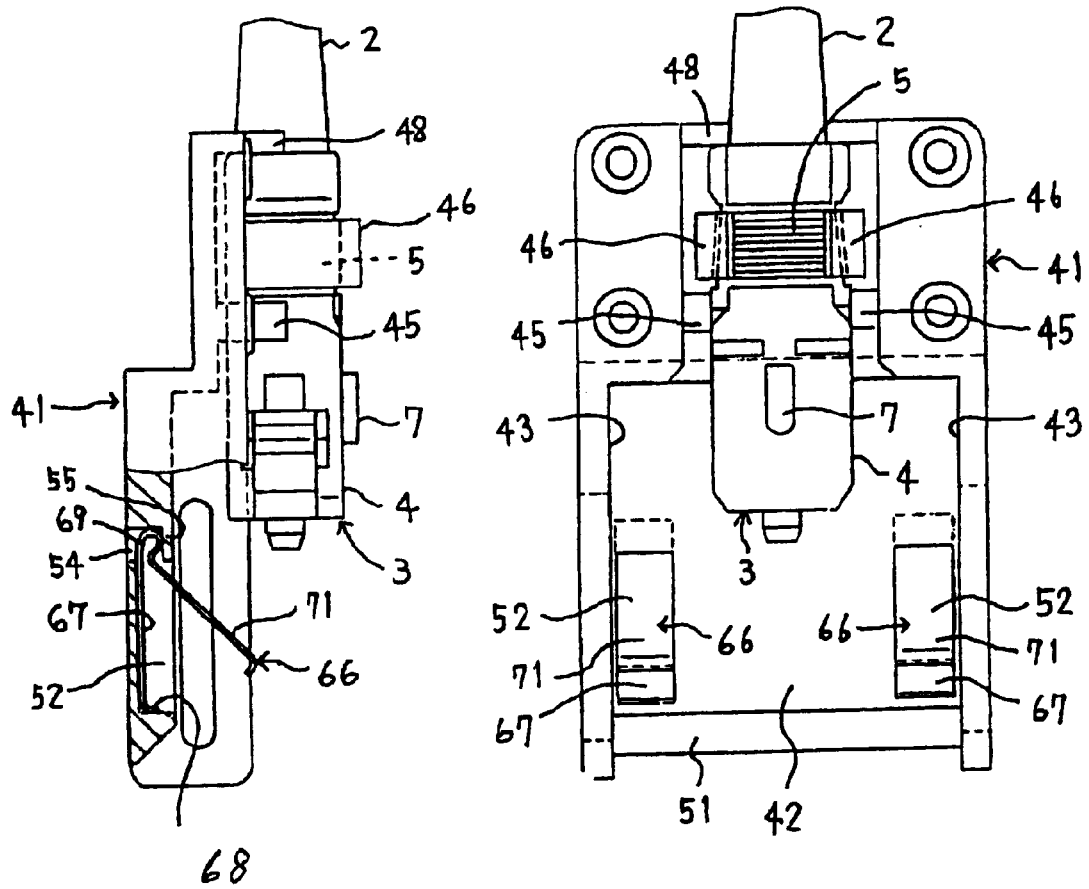
FIG. 14A is a plan view of the optical fiber connector, shown in FIG. 4, mounted on the base sown in FIG. 9.
FIG. 14B is a side and partially diagramatic view of FIG. 14A.

With reference to FIGS. 14A and 14B, a way of mounting the figure-V-shaped spring 66 to the base 41 is described in detail. FIG. 14A shows a plane view of the base 41 assembled with the optical fiber connector 31 and the springs 66, and FIG. 14B shows a side and partially diagramatic view of FIG. 14A. The springs 66 are fitted to the recessed openings 52 with the arms 67 by inserting at first the curved base portion 69 under the extending portion 55.

And then the tip portion 68 is pushed into the recessed opening 52 along the lower end of the recess 52, whereby a resilient force produced by having bent the tip portion 68 is applied on the lower end of the recessed opening 52 so as to urge edges of the tips 66 to cut into the lower end, hence the springs 66 are prevented from escaping from there. The arms 71 is maintained freely out of the surface of the flat bottom 42, hence the arm 71 can be resiliently deformed by applied force.

Further, the optical fiber connector 3 can be secured to the base 41 by fitting the connector 3 between the locking arms 46 so that the knurl portion 5 of the connector 3 becomes in agree with the position of the knurl 65 of the locking arms 46.

When fixing securely the connector 3 to the base 41, the connector 3 should be positioned so that the projection 7 face perpendicular to the sheet in FIG. 14A and the end of the outer housing 4 close to the jacket 2 meets a lower surface of positioning wall 48 as shown in FIGS. 14A and 14B, while the locking arms 46 are spread in opposing direction each other by force. After positioning as described above, the force is removed and the connector 3 is fixed securely by the locking arms 46.

As positioned as described above, the connector 3 is fixed sufficiently tightly in the right-left direction by mating between tapered walls of the knurled handle 5 and tapered inner walls of the positioning frame 45. The front-end portion of the outer housing 4 is positioned by the positioning frame 45. The end portion of outer housing 4 contacts with the position fixing wall 48, and the knurled handle 5 of the outer housing 4 is engaging with the knurl portion 65 on the bottom of the locking arm 46, hence the connector 3 is fixed securely in the upper and lower direction. As the connector 3, further, being pressed by the claws 47 so as not to rise up, the engagement between the knurled handle 5 and the knurled portion 65 serve as a mean of preventing more securely the optical fiber connector 3 from a movement 3 in a direction of the axis of the optical fiber within the connector 3.

The connector 3 can be fixed securely in the upper-lower direction by the half-round cutout 49, where there is provided suitable clearance between the outer diameter of the jacket 2 and the round edge of the half-round cutout 49.

With reference to FIGS. 15A, 15B, and 15C, the slidable base 75 is described in detail. FIGS. 15A, 15B, and 15C show a plan view, a side view, and a bottom view of the slidable base 75 respectively. Like the base 41, the slidable base 75 is made of or formed from synthetic resin, further may be made of suitable light alloy such as aluminum alloy.

A generally flat and wide portion 76 has for fixing a optical fiber connector adapter a pair of fixing tabs 77 which is perpendicular to the flat and wide portion 76 and positioned at right and left portion of the flat and wide portion 76. These tabs 77 have through holes 78 respectively.

A smaller base 79 extending downward from the flat and wide portion 76 has a projection or a finger piece 81 perpendicular to the base 79 and projecting in the opposite direction to the fixing tabs 77. As shown in FIG. 15B, the finger piece 81 includes curved surfaces for easy operation which will be described later.

As shown in FIG. 15A, the flat and wide portion 76 includes sloped portions 82, disposed at an angle 45° in the present embodiment, close to both sides of the small base 79, a through hole 83 generally below the fixing tabs 77 and within a thickness of the flat and wide portion 76, and recesses 84 having surfaces partially formed as arc on right and left ends of rear surface of the flat and wide portion 76. Right and left corners 85 of upper edge of the flat and wide portion 76 are chamfered. The through hole 83 holds a shaft so as to slide in the slit 56 of the base 41.

Figure 16B:
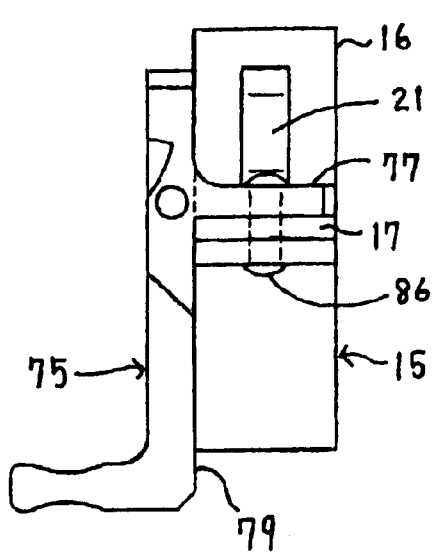
FIG. 16B is a side view of FIG. 16A.
Figure 16A:
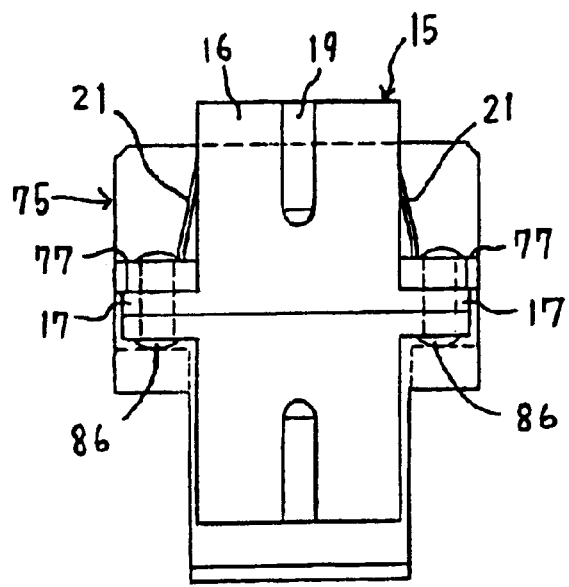
FIG. 16A is a plan view of the adapter, shown in FIG. 5, mounted on the slidable base shown in FIG. 15A.

With reference to FIGS. 16A and 16B, an assembly of the slidable base 75 including an adapter 15 is shown. FIG. 16A shows a plan view, and FIG. 16B shows a side view of the assembly respectively The adapter 15 is inserted into a space formed between the fixing tabs 77 so that the surface having the slots 19 faces frontward.

The shapes of the leaf springs 21 are deformed toward the housing 16 when the housing 15 is upwardly passed through the space formed between the fixing tabs 77, and the shapes return to their normal shapes after passing through, hence the adapter 15 can be secured up and down by the engagement between the springs 21 and the housing 16. At this time, the flanges 17 reach to the position of the fixing tabs 77 and the holes 18 are aligned with the through holes 78 on the fixing tabs 77, hence the adapter 15 is secured with the fixing tabs 77 by the use of bolts and nuts, or rivets 86 used in the present embodiment.

Figure 17:
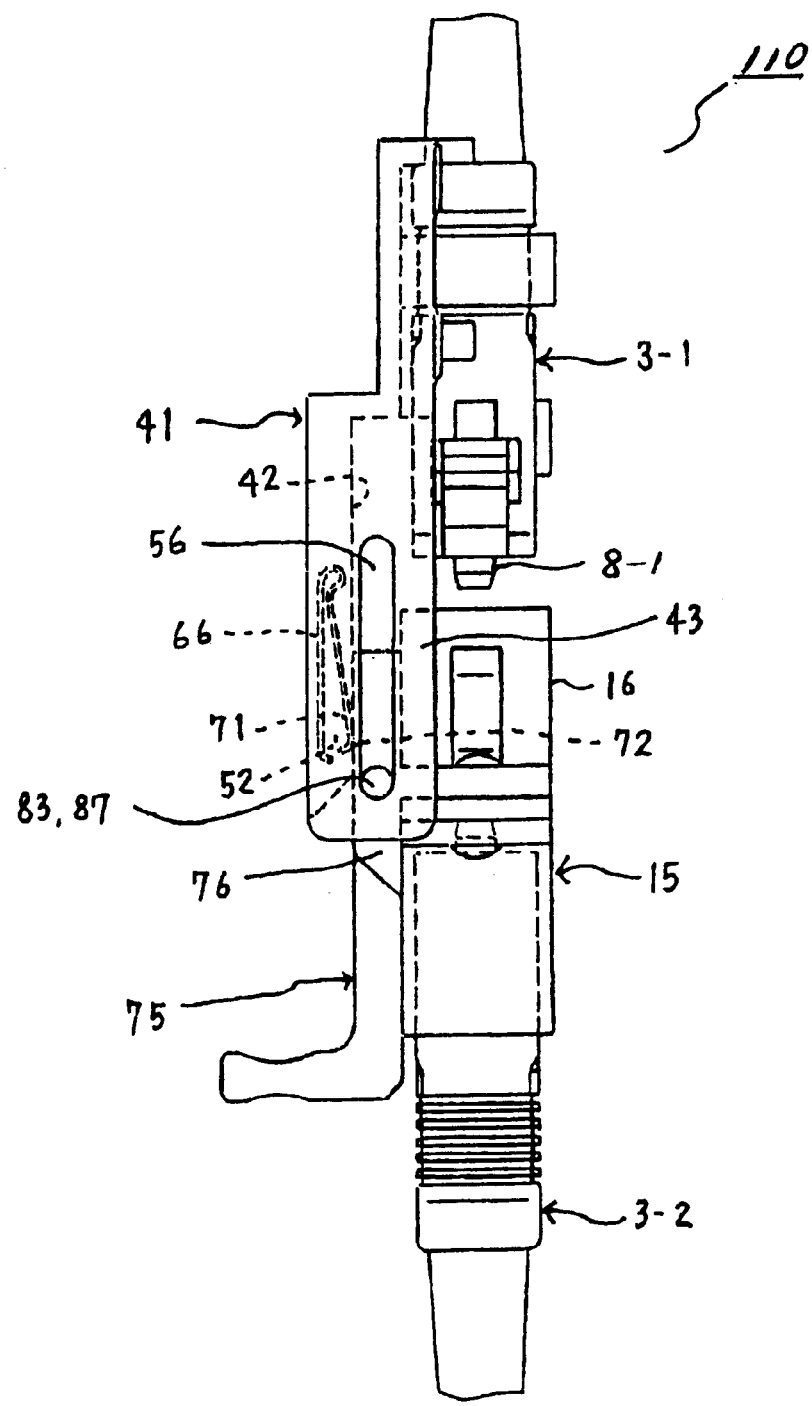
FIG. 17 is a side view of an assembly of optical connector adapter in which connectors are not coupled.

FIG. 17 shows an optical-connector adapter assembly 110 and a pair of optical connectors 3-1, 3-2. The assembly 110 includes the assembly of the base 41 shown in FIG. 14 and the assembly of the slidable base 75 with the adapter 15. In the description hereinafter, FIGS. 9 to 16 are referenced, and reference number "3-1" for the optical fiber connector mounted on the base 41, and "3-2" for the optical fiber connector mounted on the slidable base 75 are used to more easily understand the present embodiment.

Just as explained with reference to FIG. 7, the optical fiber connector 3-2 is upwardly plugged to the adapter 15 in FIG. 17. The base 41, however, is fixed securely on something such as a PCB or mounting part in the unit, which are not shown in FIG. 17.

FIG. 17 shows an optical-connector-adapter assembly 110 on which the optical fiber connectors 3-1, 3-2 are mounted, in more detail on the base 41 and on the slidable base 75 respectively. The assembly 110 can be completed in various ways. One is that the optical fiber connectors 3-1, 3-2 are mounted on a sub-assembly in which the base 41 has been joined with the slidable base 75 having the adapter 15 by a shaft 87. Another is that the connectors 3-1 and 3-2 are mounted on the base 41 and the slidable base 75 respectively before joining each other by the shaft 87. Any way a pair of the connectors 3-1, 3-2 is assembled with the base 41, 75, and the adapter 15 as shown in FIG. 17. First of all, the rear side of the slidabl base 75 shown in FIG. 16 is faced and positioned on the bottom 42 of the base 41 shown in FIG. 14. In case of use of the bases 41, 75 including the connector 3-1, 3-2 respectively, the slidable base 75 should be positioned within a portion on the bottom 42 so that the front face of the ferrule 8 of the connector 3-1 is apart from the housing 16. And then the slidable base 75 is pushed toward the bottom 42 opposing the force produced by the springs 66 until the rear side of the slidable base 75 contacts with the bottom 42, whereby the springs 66 are housed within the recessed opening 52.

At the time of the slidable base 75 being positioned on the bottom 42, the through hole 83 of the slidable base 75 can be aligned to the slits 56, whereby the shaft 87 can be put into the hole 83 via the slot 83 so that the other end of the shaft 87 projects into the other of the slits 56.

The diameter of the shaft 87 is designed so as to be a little larger than that of the through hole 83 for the tight engagement between the shaft 87 and the hole 83, and to be smaller enough to move freely in mating with slits 56. However, the shaft 87 can be fixed to the hole 83 by a suitable adhesive when being smaller than that of the through hole 83.

The slidable base 75 is guided by cooperation of the shaft 87 and the slit 56.

In the situation shown in the FIG. 17, the slidable base 75 can move upwards and downwards within the range where the shaft 87 can move within the slits 56, while being guided by the side walls 43. Further, the elevation deference between the upper side surface 44 and the bottom 42 sufficiently equals to the thickness of the flat and wide portion 76, whereby the connector 3-1 mounted on the base 41 is positioned so as to be in same optical axis with the optical adapter 15.

Figure 18:
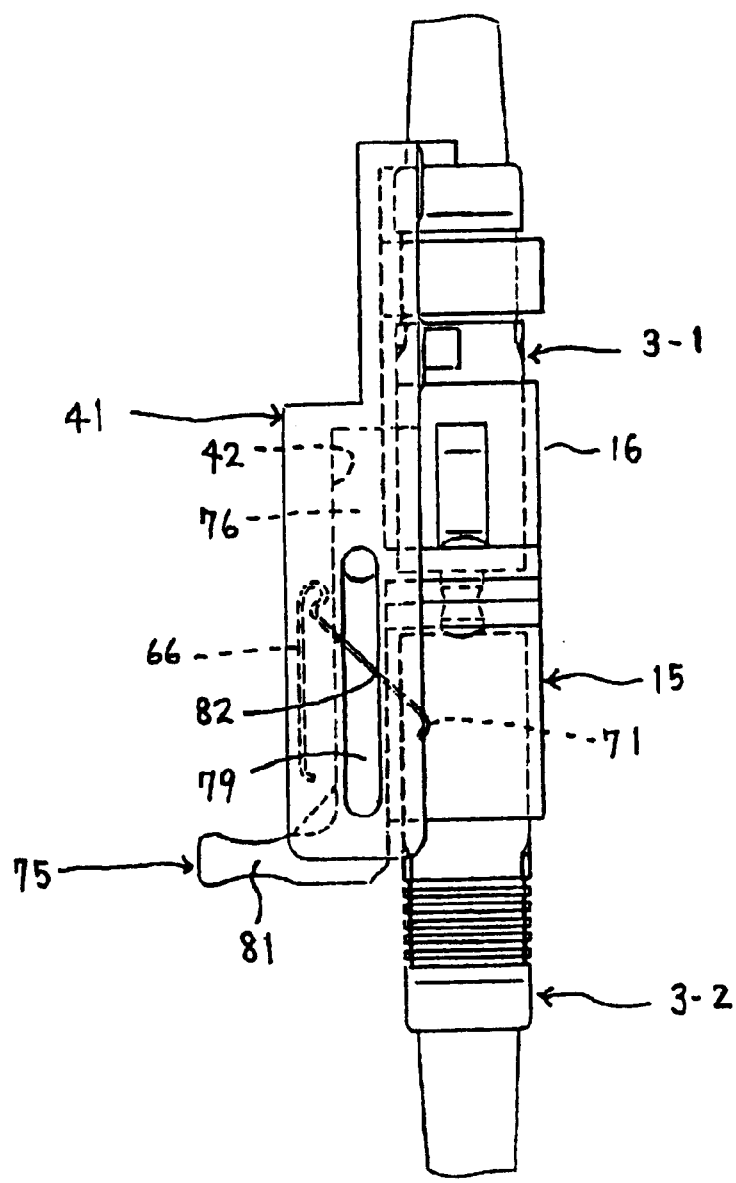
FIG. 18 is a side view of the assembly shown in FIG. 17 in which the connectors are optically coupled.

With now reference to FIG. 18, it is easily done to move the slidable base 75 toward the connector 3-1 in contact with the bottom 42.

When the connector 3-2 is urged to move towards the connector 3-1, the tip of the connector 3-1 goes into the housing 16, and the front face of the ferrule 8 of the connector 3-1 can approach that of the ferrule 8 of the connector 3-2, just as described with reference to FIGS. 4 to 8, and a pair of the connector 3-1, 3-2 can be optically coupled each other, while the inserted optical fiber connector 3-1 is fixed securely.

Further, the arm 71 of the figure-V-shape leaf springs 66 can recover to the normal shape and project out of the recessed opening 52 as shown in FIG. 18 when the sloped portion 82 passes over the tip of the springs 66. The arm 71 can, then, contact the surface of the sloped portion 82, whereby the slidable base 75 is pushed toward to the connector 3-1 and prevented moving rearward by the resilient force produced by the arm 71 in a little bent state.

Further, as described above, when a required force is applied rearward on the finger piece 81 of the slidable base 75, the connector 3-1 may be extracted from the adapter 15 during being fixed securely on the base 41.

FIG. 17 shows that the connector 3-1 has been released from the adapter 15 and the shaft 87 was moved downward by the end of the slits 56. The tip 72 of the arm 71 is contact with the rear surface of the flat and wide portion 76 of the slidable base 75 and applies a force so as to make the base 75 apart from the base 41.

As shown in the FIG. 17, the tips of the optical adapter 15 and the ferrule 8 of the optical fiber connector 3-1 are apart each other, on the other hand, the tip of the arm 72 of figure-V-shaped spring 66 contacts and applies a force on the point of the slidable base 75 upwards apart from the shaft 87, hence the slidable base 75 mounting the connector 3-2 can be moved around the axis of the shaft 87.

Figure 19:
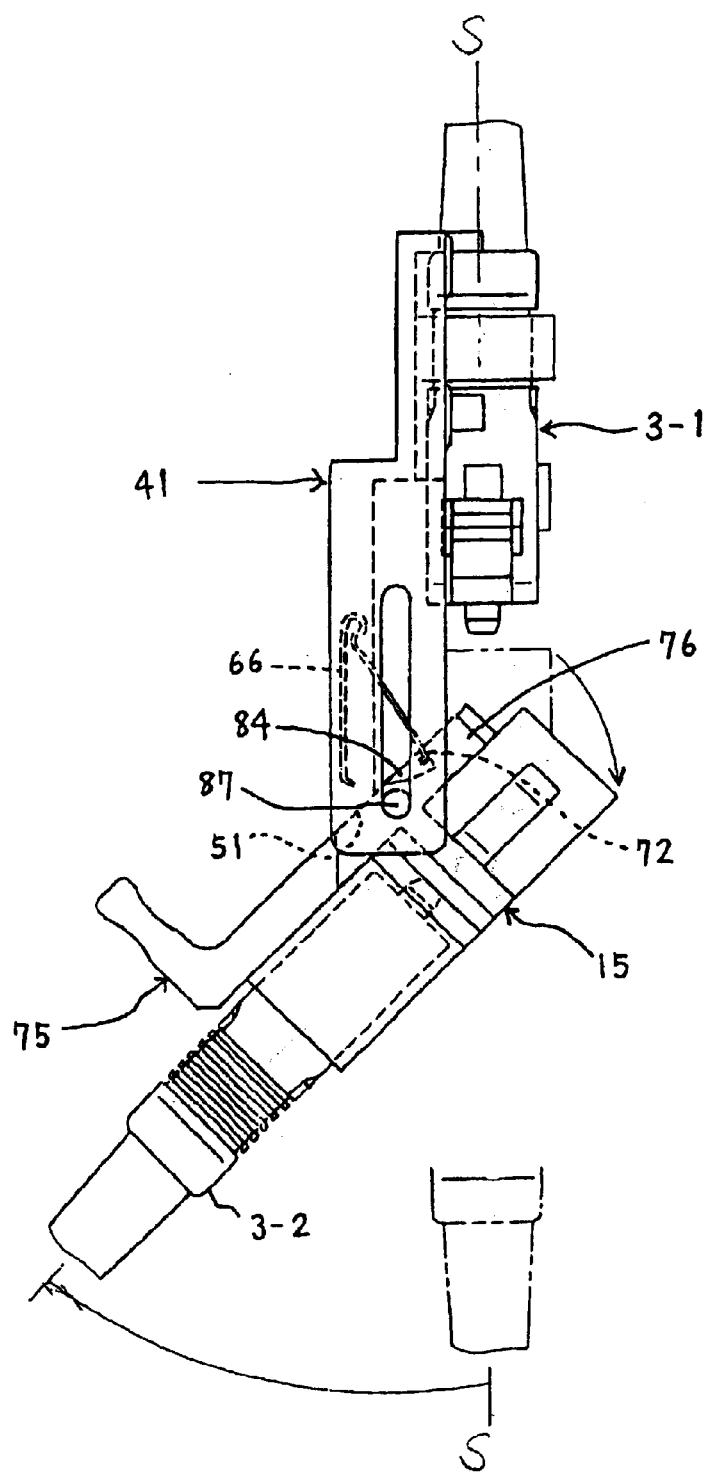
FIG. 19 is a side view of the assembly shown in FIG. 17 in which the one of the connectors is inclined to the other.

Accordingly, the slidable base 75 including the adapter 15 and the connector 3-2 are rotated together around the axis of the shaft 87 from the position shown with dash-double-dot lines to the position shown with solid lines in the rotational direction shown in the FIG. 19.

The slidable base 75 can be rotated till the rear surface of the slidable base 75 contacts to the slope 51 of the tip of the bottom 42, whereby the slidable base 75 is positioned. Therefore, the springs 66 is prevented recovering to their normal shapes, because the tips 72 of the figure-V-shaped springs 66 are engaged the recess 84 formed on the rear side of the flat and wide portion 76. Accordingly, the slidable base 75 is maintained in the position shown with solid lines in FIG. 19 by the force produced by the springs 66. In the present embodiment, the slidable base 75 is rotated through about 45° from S—S line, shown in the FIG. 19, which is generally identical with the axis of the ferrule 8 in the optical fiber connector 3-1.

At the inclined position of the slidable base 75, the connector 3-2 can be easily released from the adapter 15, and further a same type optical fiber connector connected to a test unit can be connected to the adapter 15 and to the connector 3-1 optically by rotating and pushing the slidable base 75 counterclockwise and upwardly to the connector 3-1, for example, when measurements are required.

After the test, the connector of the test unit can be exchanged for the connector 3-2 as described above, and the connector 3-2 is optically connected to the connector 3-1 again.

Figure 20A:
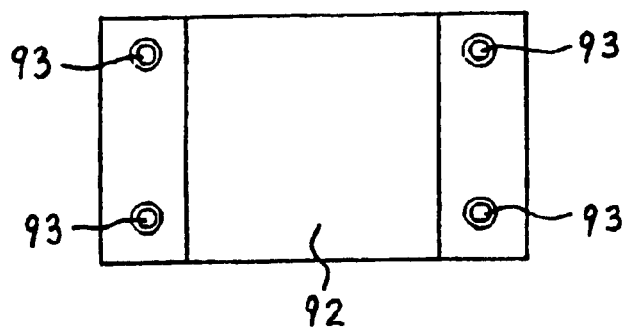
FIG. 20A is a plan view of a fixture.
Figure 20B:
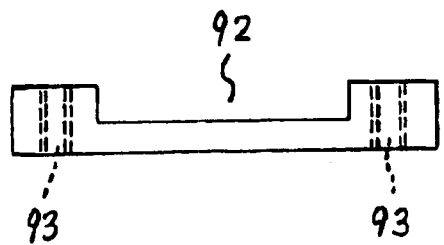
FIG. 20B is a bottom view of the fixture shown in FIG. 20A.

With reference to FIGS. 20A and 20B, a fixture 91 for fixing the assembly 110 including a pair of the connector 3-1, 3-2 is described. FIG. 20A is a plan view and FIG. 20B is a side view of the fixture 91 respectively. The shape of the fixture 91 is generally a plate, and has a groove 92 extending from upper to lower in FIG. 20A. Each of a pair of taps is formed on both sides of the groove 92. The fixture 91 is made of aluminum alloy, stainless steel, the similar metal, or suitable synthetic resin.

Figure 21:
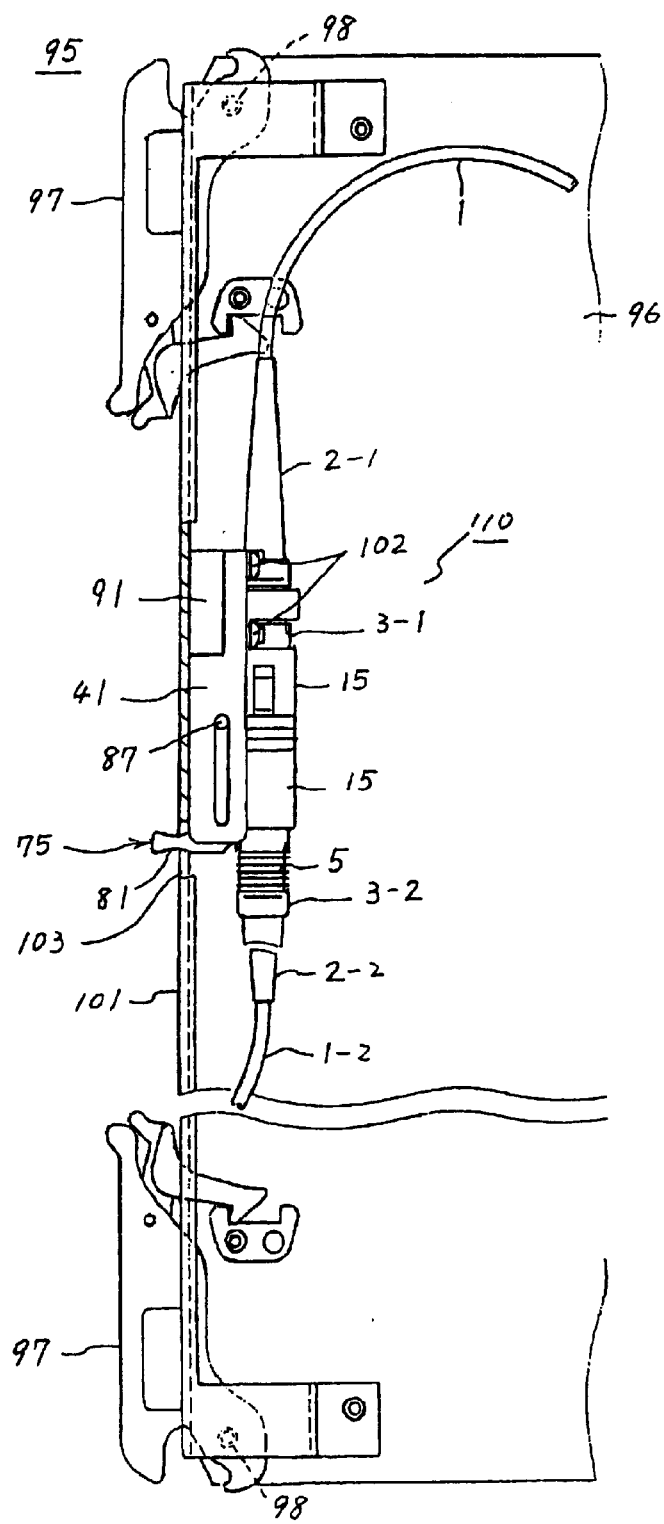
FIG. 21 is a plan view of a printed circuit board assembly.

With reference to FIG. 21, an embodiment of the assembly including the optical connector adapter assembly 110 by the present invention is described in detail. The assembly 110 is mounted on a PCB assembly 95 applied to the optical signal transmitter unit, such as WDM or ONU. FIG. 21 shows the PCB assembly 95 mounted in a rack of the unit, which is however not shown for clarity. The PCB assembly 95 is slidably inserted into the rack along the guide grooves mating with an upper and lower ends of the PCB 95, maintaining its surface being generally vertically. At a rear end portion of the PCB assembly 95 is provided connectors for electrical connection with connectors mounted on the unit. The connection between connectors of the PCB assembly 95 and the unit can be accomplished by plug-in way at the same time when the PCB assembly 95 is sufficiently inserted into the rack.

In the upper and lower corners of the front portion of a PCB 96, there are provided lever apparatuses 97 able to rotate around each pin 98 for insertion and extraction of the PCB 96 into and from the connectors of the rack. The apparatuses 97 include further rotation-lock mechanisms for preventing unintentional extraction of the PCB 96 from the rack by force applied to the apparatuses.

A front panel 101 having an uniform wide flange upstanding to the sheet is provided at the front portion of the PCB 96, hence the portion is covered from upper to lower against the exterior of the rack. The front panel 101, further includes required parts (not shown) for indicating or operating the unit.

On the inner surface of the front panel 101, the fixture 91 shown in FIG. 20 is fixed securely by the way of suitable means such as screws, spot welding or the like. The base 41 is mounted on the fixture 91 with four screws engaging with the taps 93 in this embodiment.

The thickness of the fixture 91 is generally equal to the height difference 63 shown in FIG. 10A or 10B, hence the rear surface of the bottom 42 just contacts the inner surface of the front panel 101. Accordingly, the assembly 110 is mounted on the front panel 101 as shown in FIG. 21, wherein the optical fiber cables 1-1 and 1-2 are optically connected each other and in generally parallel with the inner surface of the front panel 101 at predetermined space interval.

Figures 22A, 22B:
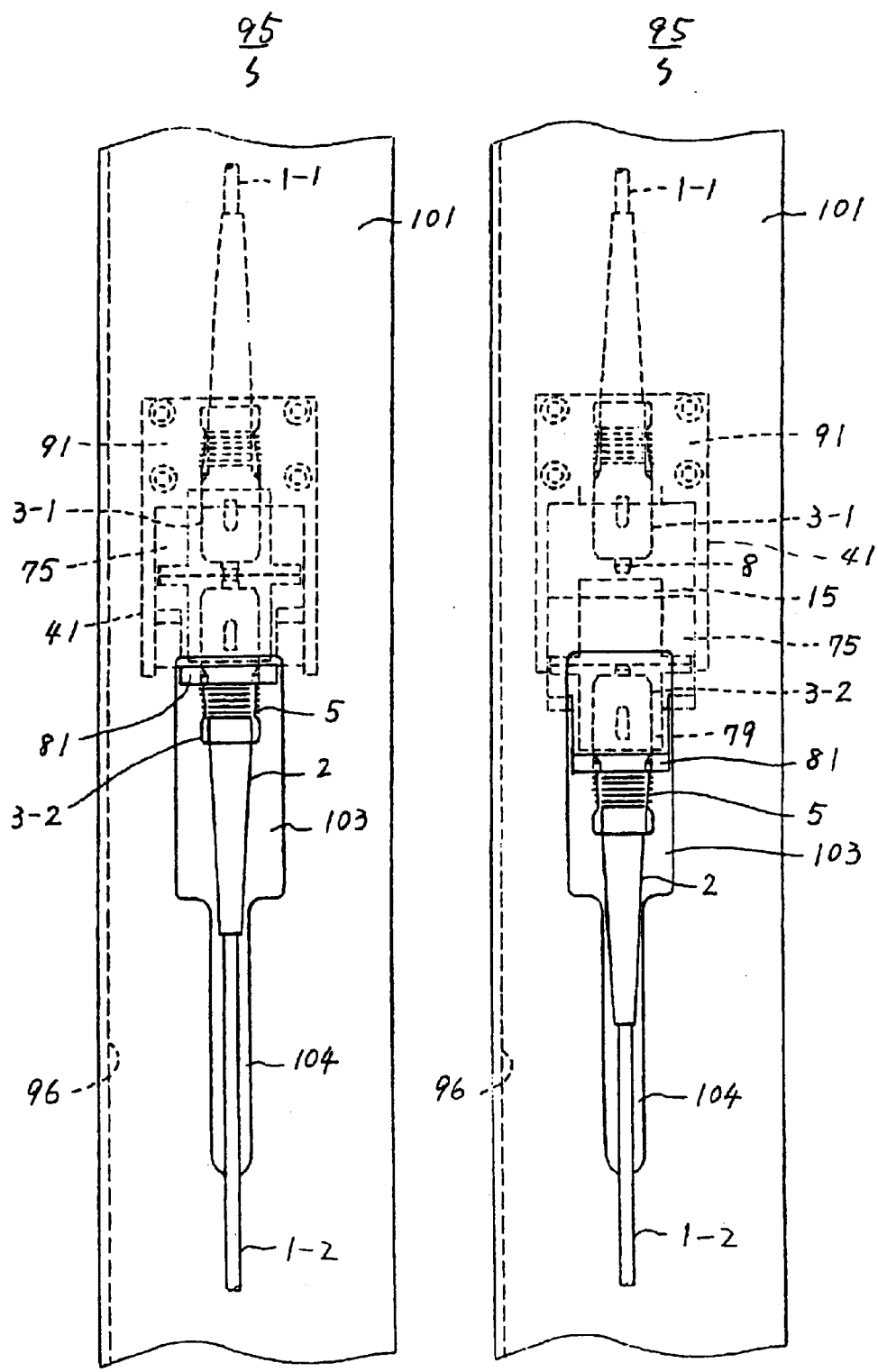
FIG. 22A is a partial diagrammatic view taken in the direction of the arrow M in FIG. 21.
FIG. 22B is a partial diagrammatic view taken in the direction of the arrow M in FIG. 21, and shows that the lower connector is uncoupled form the other.

With reference to FIGS. 22A and 22B, the operation of the assembly 110 is described in detail. FIG. 22A shows a front view of the PCB assembly 95 including the front panel 101 and the assembly 110. The front panel 101 includes a generally rectangular opening 103 and a narrow opening 104 which is formed continuously downwards form the opening 103. The lateral width of the opening 103 is wider than that of the finger piece 81 of the slidable base 75 so that the finger piece 81 can outwardly project beyond the opening 103 as shown in FIG. 21.

The lateral width of the narrow opening 104 is the generally same with that of the jacket 2 or a little wider, hence the fiber cable 1-1 can be outwardly extended beyond the opening 104.

The base 41 is mounted on the rear side of the front panel 101, as shown with dotted lines in FIGS. 22A and 22B, in a position upper apart from the opening 101.

The PCB assembly 95 used in the unit is for transmitting optical signals, hence the other end of the optical fiber 1-1 relative to the optical fiber connector 3-1 is coupled with an optical transmitter-module, in this embodiment, including a semiconductor laser, which is not shown in FIGS. 22A and 22B, hence a laser light is transmitted to the front face of the ferrule 8-1 within the connector 3-1 when the module is active.

During the optical module being active, the connector 3-2 should be released from the assembly 110 when tests for measuring the signals generated in the PCB assembly 95 or transmission line connected with the connector 3-2 are required. In these tests, an optical fiber connector of a measurement unit is exchanged for the connector 3-2 and the connector 3-2 is re-connected after these testes.

These operations are described with reference to FIGS. 22B, 23 and 24. To release the connector 3-2 from the assembly 110 the finger piece 81 can be downwardly pulled in front of the front panel 101, hence the connector 3-2 with the adapter 15 is downwardly moved from the connector 3-1 as shown in FIG. 22B.

Figure 23:
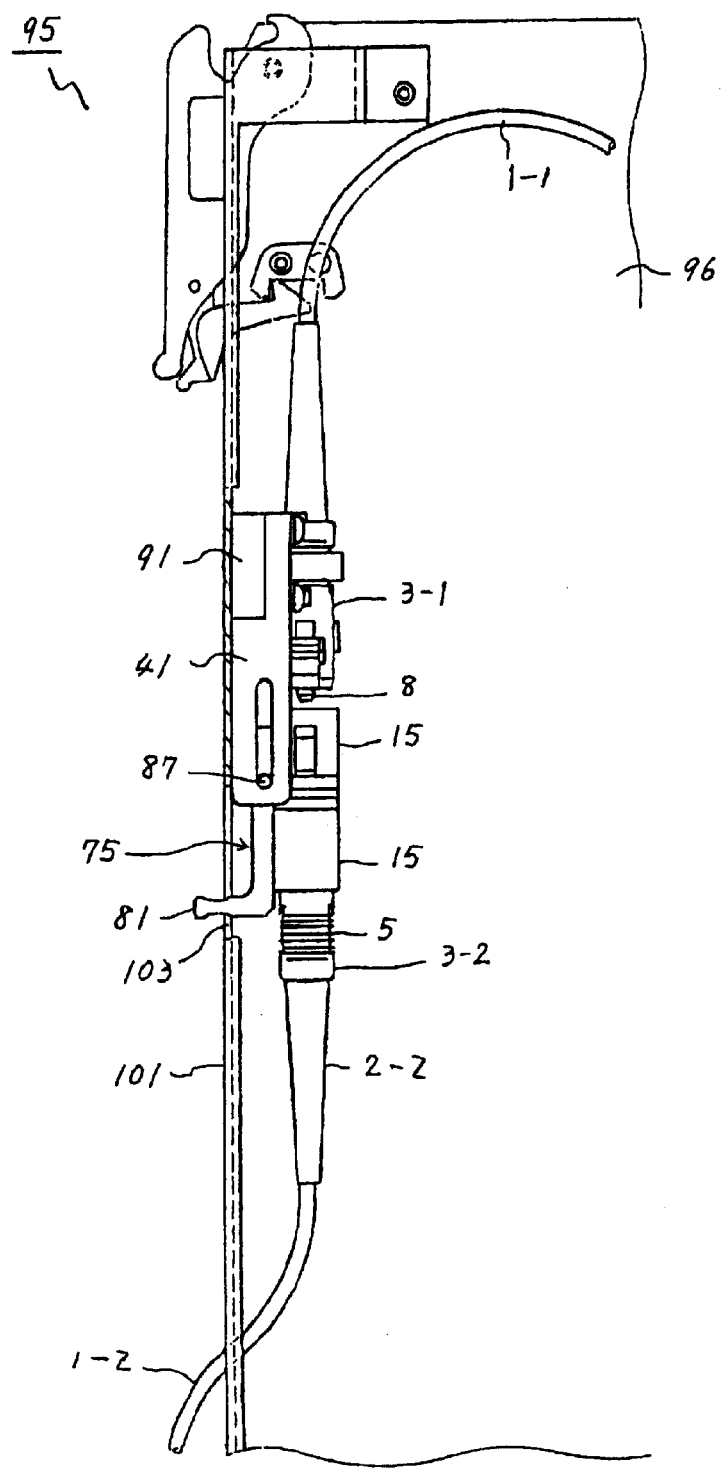
FIG. 23 is a plan view of the printed circuit board shown in FIG. 21, and shows that the lower connector is uncoupled form the other.
Figure 24:
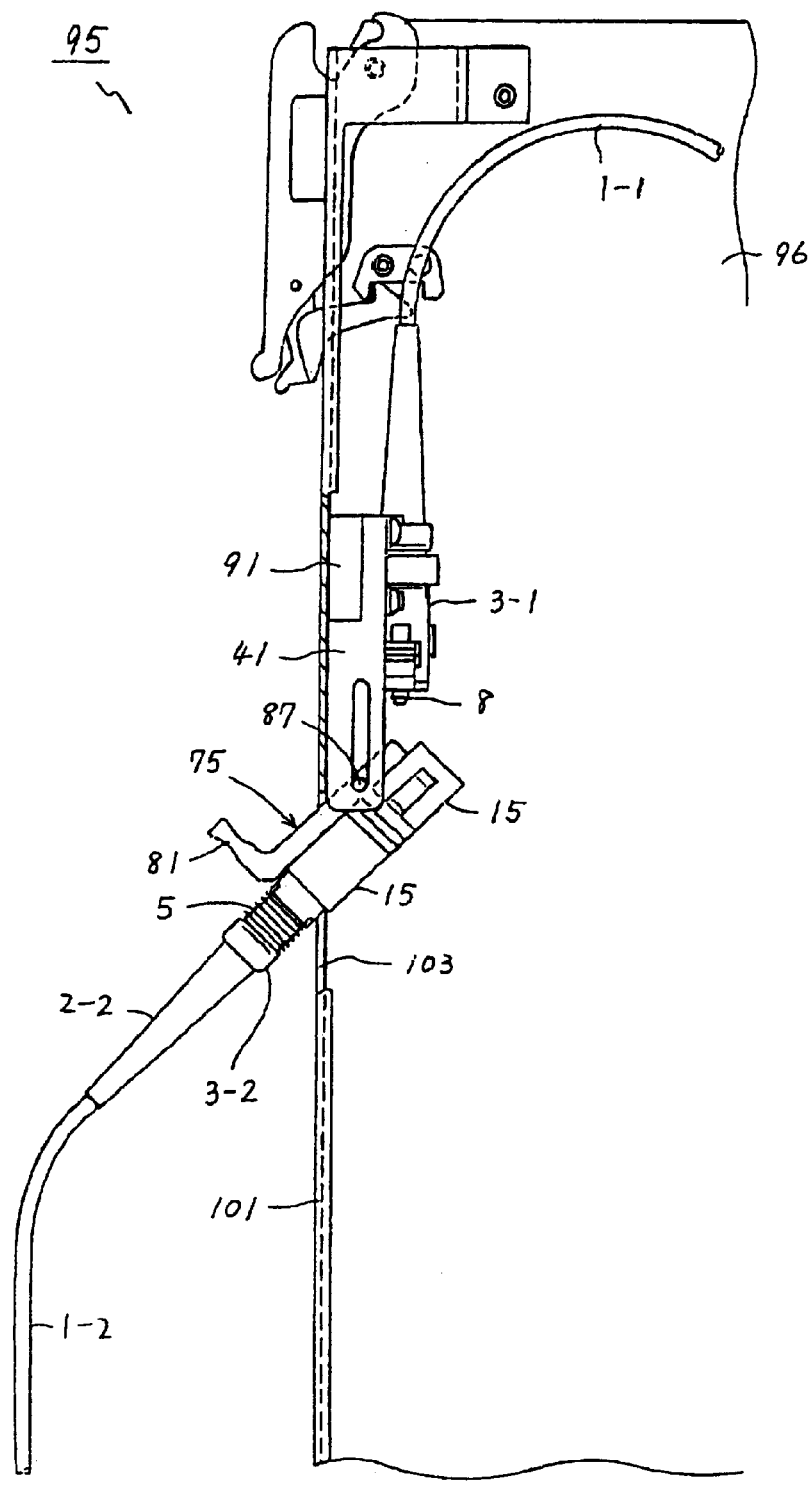
FIG. 24 is a plan view of the printed circuit board shown in FIG. 21, and shows that the lower connector is inclined relative to the upper connector.

Further the finger piece 81 can be downwardly pulled to a position where the slidable base 75 is allowed to rotate around the axis of the shaft 87 as shown in FIG. 23 and to incline obliquely so as to exclude at least the portion of the knurled handle 5 of the connector 3-2 beyond the front panel 101 as shown in the FIG. 24.

Figure 25:
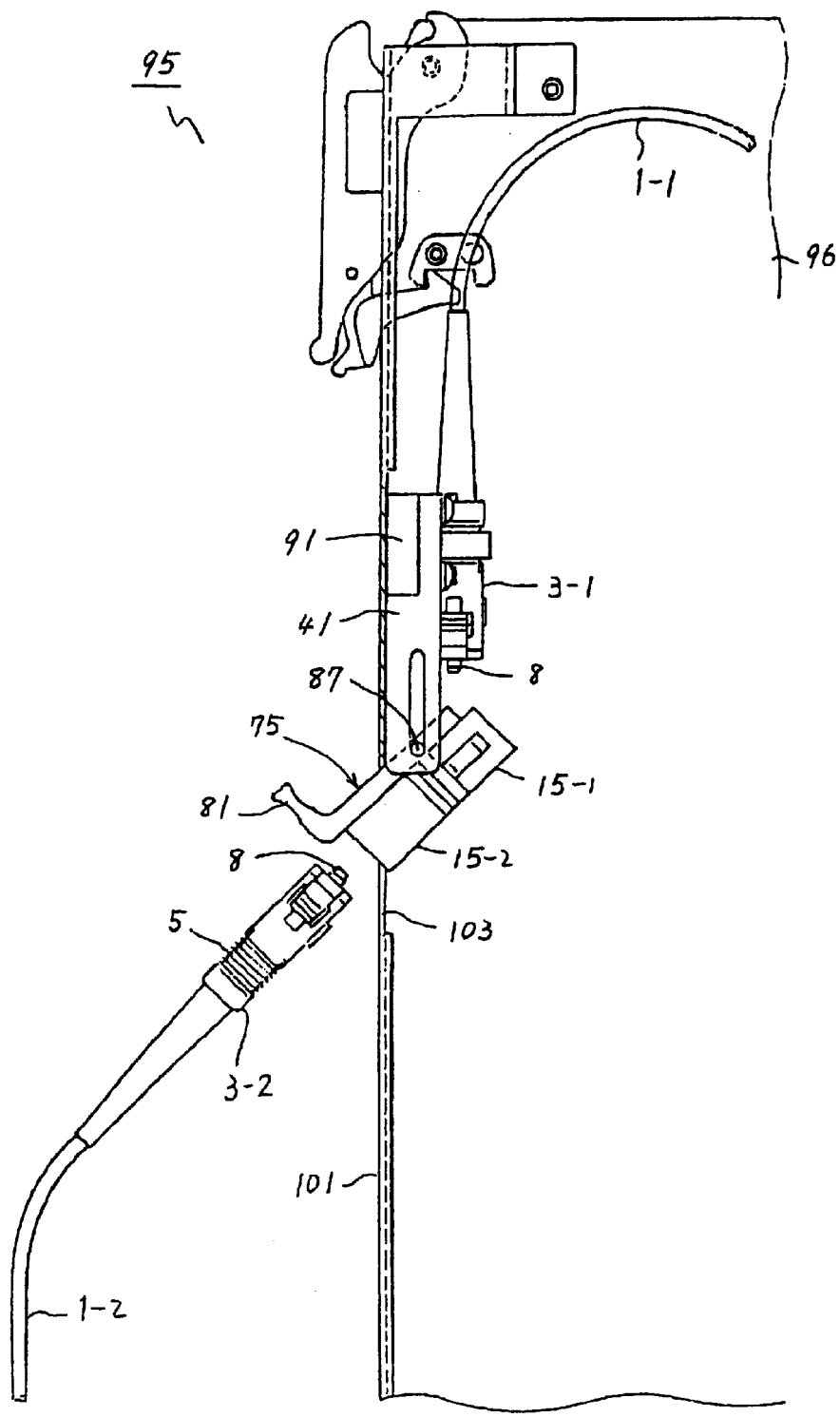
FIG. 25 is a plan view of the printed circuit board shown in FIG. 21, and shows that the lower connector is released from the adapter.

The obliquely inclined slidable base 75 including the connector 3-2 leads to an easy release of the connector 3-2 from the adapter 15 in the exterior space relative to the front plate 101 as shown in FIG. 25. Conversely, the same type of connector or the equivalent can be optically connected with the connector 3-1 in the reverse order. The reverse order is diagrammatically shown in the sequence of FIG. 24, FIG. 23, and then FIG. 21.

The shapes and the positions of the opening 103 and the narrow opening 104 are designed so as to allow the slidable base 75 including the connector 3-2 to move as described above.

Without looking the front face of the ferrule 8 of the connector 3-1, it is possible to position and insert the connector 3-2 relative to the adapter 15 by the use of the assembly 110 of the present embodiment, and further to optically connect or release the connector 3-2 with or from the connector 3-1. Therefore, the present invention provides the improved means to avoid to be impinged by a laser light at connecting or releasing an optical fiber connector to or from the other one.

In the embodiment described above, cooperation of the shaft 87 and the slit 56 is substantially equivalent to a guide for guiding the base 41 during such movement so that the slidable base 75 moves near to and apart from the base 41, and a supporter for supporting the slidable base 75 when the slidable base 75 is rotated in such a direction to increase an angle of inclination of the slidable base 75 to a direction of movement of the slidable base 75 guided by the shaft 87 and the slit 56.

Further, the adapter 15 without the leaf springs 21 may be used as a adapter, because the adapter 15 can be fixed securely to the slidable base 75 by bolts and nuts, rivets or the like.

Still further, the adapter 15 may be replaced by a part which has a function to align the axes of the optical fibers in the ferrules 8-1, 8-2.

Still further, the adapter 15 may be mounted on the base 41 and the fixing parts, such as the half-round cutout 49 and the locking arm 46, formed on the base 41 may formed on the slidable base 75.

Still further, the figure-V-shaped leaf spring 66 has functions which moves the slidable base 75 near to the base 41 and retains the inclination of the slidable base 75 when the slidable base 75 is inclined. The functions may be performed by two parts such as two springs.

Figure 29:
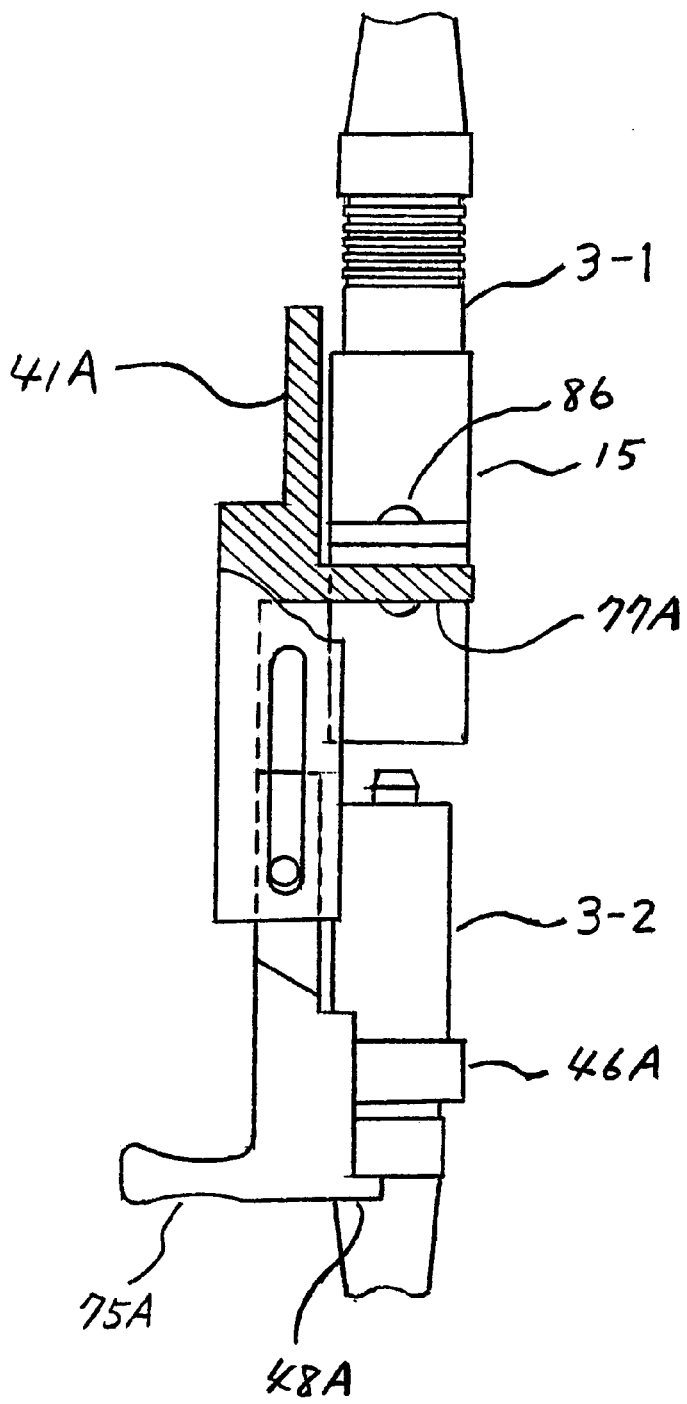
FIG. 29 is a side view of an assembly of optical connector adapter in which connectors are not coupled.

With reference to FIG. 29, another embodiment is described. In this embodiment, a base 41A includes a pair of fixing tabs 77A formed or provided on the base 41A for fixing the adapter 15 by rivets 86, and a sidable base 75A includes parts, such as a locking arm 46A and a position-fixing wall 48A, for fixing the optical fiber connector 3-2 to the silidable base 75A. The sidable base 75A can move toward and away from the base 41A, which may be fixed on a PCB or the lake via bolts or rivets via the fixture 91, while being guided by similar or same parts or members shown in the optical-connector adapter assembly 110. And in the same manner as the assembly 110 the slidable base 75A can be held in an inclined position by similar or same parts shown in the assembly 110.

Accordingly, this embodiment provides an arrangement that the optical fiber connector 3-1 is held via the adapter 15 to the base 41A, and the optical fiber connector 3-2 is held on the slidable base 75A, while in the optical-connector adapter assembly 110 the connector 3-1 is held on base 41 and the connector 3-2 is held via the adapter 15 to the silidable base 75. Detailed structures for fixing the optical fiber connector 3-2, the slidable base 75A, and the base 41A are not described, because it is easily understood a way to modify the structure of the base 41 onto the slidable base 75A, modification of both base 41 and 75. This embodiment shown in FIG. 29 can provide similar or identical advantages which is provided by the optical-connector-adapter assembly 110.

Figure 26:
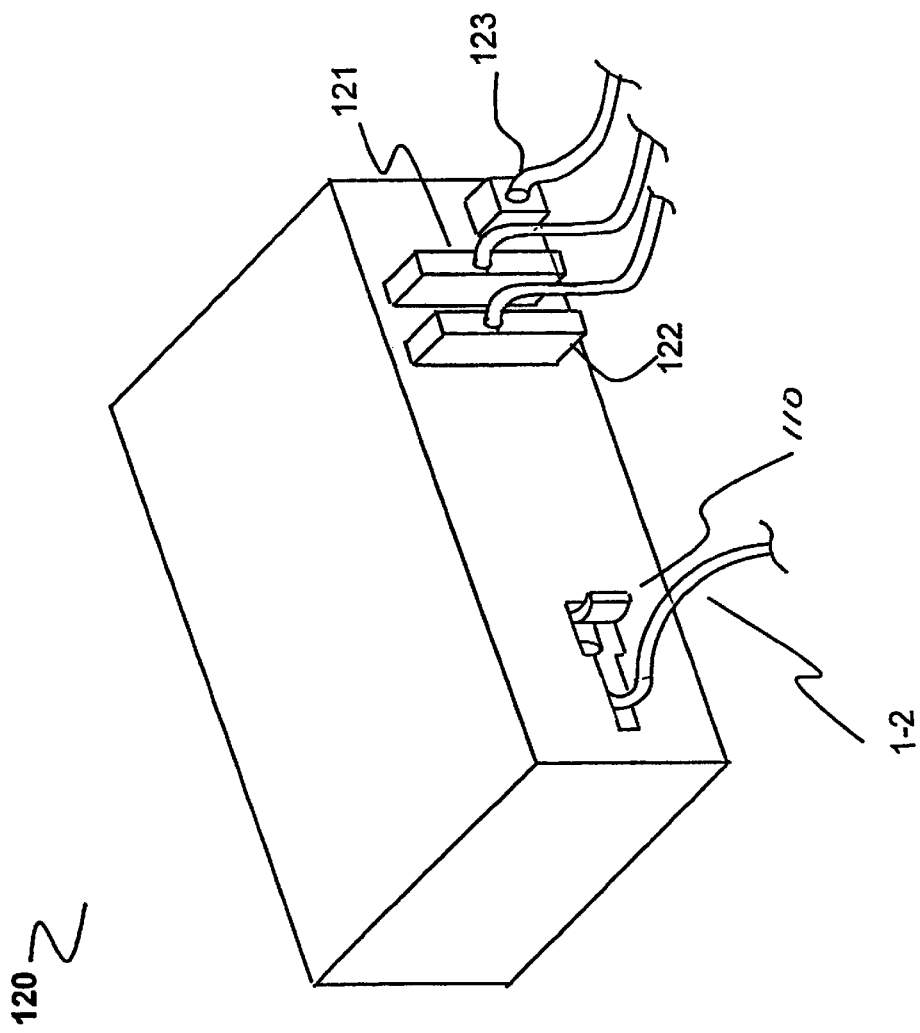
FIG. 26 is a perspective view taken from a rear of a computer.

With reference to FIG. 26, a personal computer including the assembly 110 for connecting a transmission line using an optical fiber is explained. For simplicity, inputs devices such as a keyboard or mouse, display device such as CRT or liquid crystal display, and peripheral devices such as hard disk, optical disk, or floppy disk are not shown. FIG. 26 shows a perspective view taken form a rear of the computer 120. The assembly 110 is mounted on a PCB in at the computer 120 and located a rear portion in the computer 120 so that the finger piece 81 is positioned beyond a back panel of the computer 120. On the back panel, a connector 121 for interface with a display device, a connector 122 for an input device, and a power cable 123 are located. In this computer 120, the assembly 110 is located so that the direction of the axis of the optical connectors mounted on the assembly 110 are horizontal. The optical fiber 1-2 is connected with a network using optical fiber cable which is not shown. The assembly 110 provides an easy and safe handling for a person who is not familiar with the skill in the optical engineering.

Figure 27:
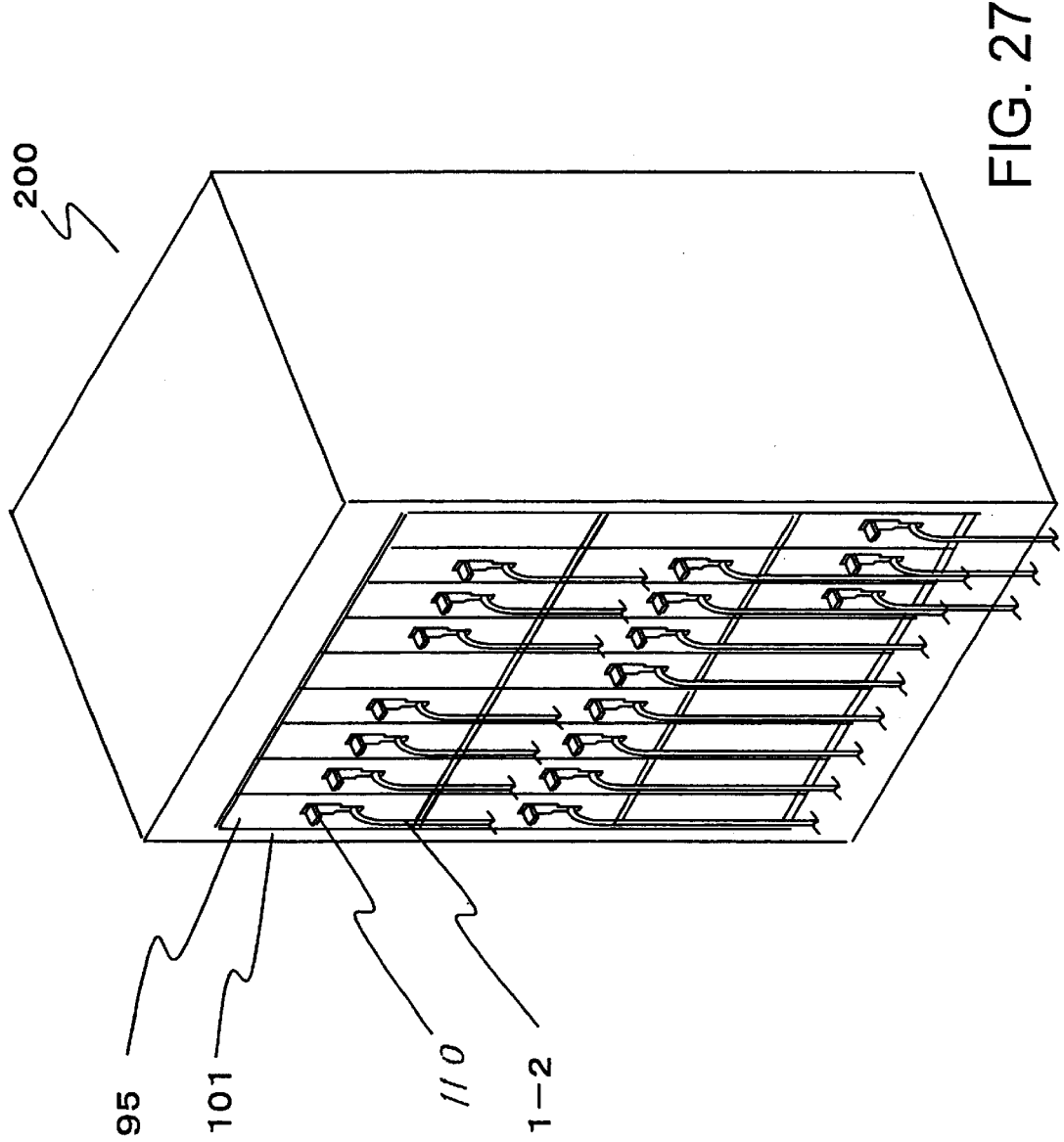
FIG. 27 is a perspective view of an optical processing unit.

FIG. 27 shows an optical signal processing unit 200 such as WDM or a unit in photonic network. There are located many printed circuits board assemblies 95 with front panels 101 at the front of the unit. Some of the assemblies 95 have the optical fiber connector adapter assemblies 110 and the optical cables 1-2 which are other units not shown. Three racks are mounted in this unit which has approximately 800 mm in width, 800 mm in depth and 2200 mm in height. The adoption of the assemblies 110 allows the size of the unit 200 to be small and compact.

Figure 28:
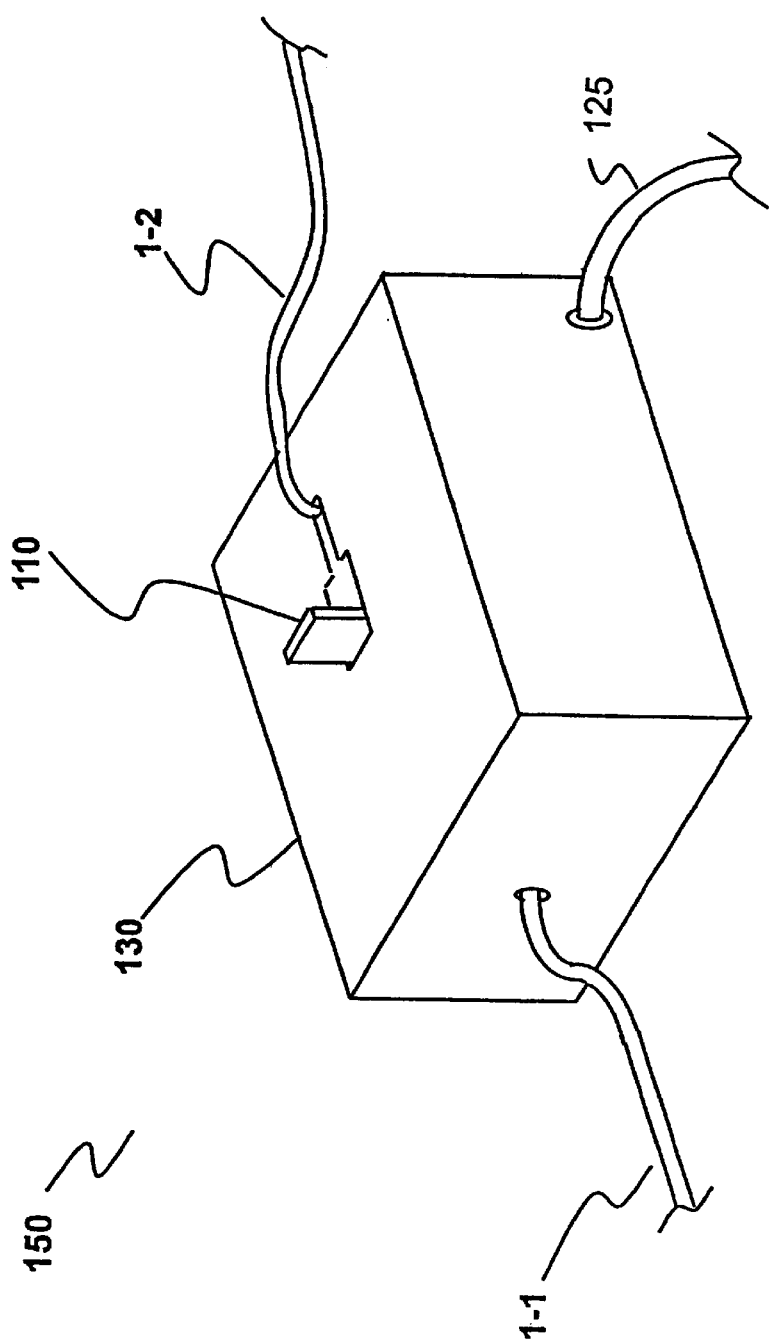
FIG. 28 is a perspective view of an optical adapter.

FIG. 28 shows an optical unit 150 as an optical network unit or an adapter suitable for receiving an optical fiber cable delivered to a home. The unit 150 includes a case 130, the optical fiber connector adapter assembly 110, power cable 125 and the optical fiber cables 1-1,1-2. In this embodiment, the optical fiber cable 1-1 may be an optical fiber cable delivered to the home, and the optical fiber cable 1-2 may be connected to a personal computer such as shown in FIG. 26, a television set or the like. The assembly 110 provides an easy and safe handling for a person who is not familiar with the skill in the optical engineering.

In the embodiments, SC type optical fiber connectors are used for the optical fiber connector 3-1, 3-2, however the other types of the connector such as an optical fiber connector including some optical fibers are available to use for the invention. The assembly is mounted on the front panel of the PCB in the embodiment, however the assembly can be used within a desktop type unit, an outdoor type unit for use in outdoors, or a mobile unit.

Furthermore, the mounting direction of the optical fiber connector 3-1 defined as the direction of travel of the laser light in the optical fiber within the ferrule 8-1 of the connector 3-1 mounted on the base 41 is vertical as shown in FIGS. 21 to 25 in the embodiment, however it is available to mount the assembly 110 in any direction such as horizontally, obliquely, or inversely mounting direction.

In the optical fiber connectors optically coupling with each other, the assembly occupies small space equivalent to the portion of projection of the arm 81 in front of the panel 101, because the assembly can be located so as to be generally parallel with the front panel 101. Accordingly, the assembly allows the unit to be design smaller.

As described above, the optical fiber connector adapter structure or the optical fiber connector adapter assembly for optical fiber connectors is capable to hold securely the first optical fiber connector and to connect or disconnect with the second optical fiber connector via the optical fiber connector adapter. The adapter mounted on the slidable base can be moved toward and away from the first optical fiber connector, and inclined to the base in a position apart from the first optical fiber connector, whereby the second optical fiber connector can be connected or disconnected with optical fiber connector adapter in an incline position.

Accordingly, in the slidable base in the inclined position can be inserted the second optical fiber connector, then the slidable base can be returned to an original direction of the optical axis or so as to opposing to the first optical fiber connector and the adapter can be connected with the first optical fiber connector by moved near to the first connector. Therefore both optical fiber connectors are optically coupled via the optical adapter without particular operation to check the position of the first optical fiber connector.

The figure-V-shaped spring can apply a force so as to move the optical fiber connector adapter towards to the first optical fiber connector, whereby the optical connection between the first and second connectors is prevented from unintended disconnection or unstable connection between both connectors. Further, the spring may apply a force so as to turn the optical fiber connector adapter to an inclining position, the position is held so stable that operation of connection or disconnection of the first optical fiber connector may be done easily.

The base and the first optical fiber connector are mounted within the unit, and a second optical fiber connector is mounted in a position to be operated for connection or disconnection thereof from outer of the unit. Accordingly, the second optical fiber connector out of the unit may be connected and disconnected to the adapter under enhanced safety even during the first optical fiber connector being active.

These practical effects are brought by the optical fiber connector adapter provided by the present invention.

While various embodiments of the present invention have been shown and described, it should be understood that other modifications, substitutions and alternatives may be apparent to one of ordinary skill in the art. Such modifications, substitutions and alternatives can be made without departing form the spirit and scope of the invention, which should be determined from the appended claims.

Various features of the invention are set forth in the appended claims.

What is claimed is:

1. An apparatus, comprising:
a first base having a first holder, holding a first optical connector, and a slit; and
a second base having a second holder, holding a second optical connector, and a shaft, the shaft being engaged in the second holder and extending through the slit in the first holder and coupling the first and second holders together, the second base being moveable relatively to the first base, sliding the shaft along the slit thereby to selectively, optically connect and disconnect the second optical connector to, and from, the first optical connector.

2. An apparatus according to claim 1, comprising:
an adapter arranged on the second base.

3. An apparatus according to claim 1, comprising:
an adapter arranged on the first base.

4. An apparatus to optically connect a pair of optical fiber connectors, comprising:
a first base to mount a first optical fiber connector;
a second base to mount a second optical fiber connector;
an adapter to retain each of the first and second optical fiber connectors and to align respective optical fibers within the first and second optical fiber connectors, said adapter being mounted on a selected one of said first and second bases;
a guide to guide said second base during axial movement of said second base near to or apart from said first base; and
a supporter to maintain a connection of said second base to said first base during the axial movement while permitting rotation of said second base, when moved from the first base, away from the axial aligned relationship with the first base.

5. An apparatus claimed in claim 4, further comprising:
a fixture to fix the optical fiber connector in order to position an axis and an end of the optical fiber included in the optical fiber connector, said fixture being formed on the non-selected one of said first and second bases and.

6. An apparatus claimed in claim 5, further comprising:
a first lock to apply a force to said second base so that said second base moves toward said first base; and
a second lock to apply a force to said second base in a direction so that said second base increases the angle of rotation from the axial aligned relationship.

7. An apparatus claimed in claimed 6, wherein said first lock and said second lock are commonly made of a leaf spring.

8. An apparatus claimed in claim 5, wherein said second base has a projection extending in a direction generally perpendicular to the direction of axial movement of the second base and in a generally common direction of movement of said second base when said second base starts to be rotated.

9. An apparatus claimed in claim 4, wherein said guide comprises a shaft fixed on one of said first and second bases and a guiding portion formed on the other of said first and second bases, the shaft being in a clearance fit with the guiding portion and commonly used as a portion of said supporter.

10. An apparatus claimed in claim 9, wherein the shaft engages the guiding portion in range such that said second base moves from a first position and a pair of optical fiber connectors meet each other at a second position such that said second base is inclined, and said second base is rotated around an axis of said shaft at the second position.

11. An apparatus claimed in claim 5, wherein said second base further includes a projection extruding in a direction perpendicular to the axial movement.

12. An apparatus to optically connect a pair of optical fiber connectors, comprising:
a first base to mount a first optical fiber connector;
a second base to mount a second optical fiber connector;
an adapter to retain each of the optical fiber connectors and to align respective optical fibers within the first and second optical fiber connectors, said adapter being mounted on the second base;
a guide to guide said second base during axial movement of said second base near to or apart from said first base, said guide including a shaft mounted on said second base and engaged in a guiding portion of said first base, wherein the shaft is in a clearance fit with the guiding portion permitting movement of said second base near to or apart from said first base in an axial direction guided by the shaft and the guiding portion, and said second base is selectively rotatable around an axis of the shaft in a direction to increase an angle of inclination of said second base relatively to the axial movement of said second base, as guided by said guide, when said second base is positioned at a predetermined position such that said adapter is apart from the first optical fiber connector mounted on said first base; and a force applying element, mounted on said first base, to apply a force on said second base in such direction so that said first and second bases move near each other, and in such direction so that said second base is rotated until the inclination of said second base is prevented by said first base.

13. An apparatus claimed in claim 12, further comprising;

a projection formed on said second base, said projection extending in a direction generally perpendicular to the direction of axial movement of the second base and in a generally common direction of movement of said second base when said second base starts to be rotated.

14. An apparatus claimed in claim 13 further comprising:

a pair of first and second optical fiber connectors for transmitting an optical signal therebetween.

15. An apparatus claimed in claim 14, wherein each optical fiber connector is an SC type optical fiber connector.

16. A printed circuit board for transmitting or receiving optical signals including the apparatus claimed in claim 4, comprising:

a front panel mounting the apparatus, wherein said front panel includes an opening through which a portion of said second base and the optical fiber connector mounted thereon extend to an exterior of said front panel relative to the printed circuit board, located on the interior of the front panel, when the second optical fiber connector is mounted on said second base.

17. A printed circuit board for transmitting or receiving optical signals including the apparatus claimed in claim 12, comprising:

a front panel mounting the apparatus, wherein said front panel includes an opening through which a portion of said second base and the optical fiber connector mounted thereon extend to an exterior of said front panel relative to the printed circuit board, located on the interior of the front panel, when the second optical fiber connector is mounted on said second base.

18. A unit for operating an optical signal including the apparatus claimed in claim 4, wherein the apparatus is mounted within the unit so as to position vertically an optical axis of one of the first and second optical fiber connectors mounted by the respective one of the first and second bases of the apparatus.

19. A unit claimed in claim 18, wherein the unit comprises a personal computer.

20. A unit claimed in claim 18, wherein the unit comprises an optical network unit.

21. A unit for operating an optical signal including the apparatus claimed in claim 12, wherein the apparatus is mounted within the unit so as to be positioned vertically relative to an optical axis of one of the first and second optical fiber connectors mounted by the respective one of the first and second bases of the apparatus.

22. An apparatus according to claim 1, wherein the second base is rotatable about an axis of the shaft at a position thereof in the slit when the second base is disconnected from the first base.

* * * * *

UNITED STATES PATENT AND TRADEMARK OFFICE
CERTIFICATE OF CORRECTION

PATENT NO.   : 6,550,977 B2
DATED        : April 22, 2003
INVENTOR(S)  : Hidehiko Hizuka It is certified that error appears in the above-identified patent and that said Letters Patent is hereby corrected as shown below:

Column 16,
Line 24, delete "and".

Signed and Sealed this

Twenty-sixth Day of August, 2003

JAMES E. ROGAN
*Director of the United States Patent and Trademark Office*